US012632412B2

(12) United States Patent
Bhattacharya et al.

(10) Patent No.:  US 12,632,412 B2
(45) Date of Patent:       May 19, 2026

(54) SYSTEM AND METHOD FOR PRIORITIZING MIGRATION SEQUENCE OF DATA FILES OF AN APPLICATION FROM A SOURCE-STORAGE IN A SOURCE-SYSTEM TO A TARGET-STORAGE IN A TARGET-SYSTEM IN A CONTACT CENTER

(71) Applicant: NICE LTD., Ra'anana (IL)

(72) Inventors: Rohan Bhattacharya, Kolkata (IN); Nishu Bansal, Pune (IN); Aritra Dasgupta, Pimpri Chinchwad (IN)

(73) Assignee: NICE LTD, Ra'anana (IL)

( * ) Notice: Subject to any disclaimer, the term of this patent is extended or adjusted under 35 U.S.C. 154(b) by 97 days.

(21) Appl. No.: 18/939,591

(22) Filed: Nov. 7, 2024

(65) Prior Publication Data

US 2026/0127136 A1      May 7, 2026

(51) Int. Cl.
*G06F 16/11*          (2019.01)
*G06F 11/1446*      (2026.01)

(52) U.S. Cl.
CPC ........ *G06F 16/122* (2019.01); *G06F 11/1448* (2013.01); *G06F 2201/80* (2013.01)

(58) Field of Classification Search
None
See application file for complete search history.

(56) References Cited

U.S. PATENT DOCUMENTS

2014/0325151 A1*  10/2014  Kim ...................... G06F 16/185
                                                                                711/117
2019/0206561 A1*   7/2019  Shelton, IV ........... G16H 40/67
2021/0034273 A1*   2/2021  Perneti ................ G06F 11/1461

(Continued)

FOREIGN PATENT DOCUMENTS

CN          119166592 A   *  12/2024  ............. G06F 16/23

OTHER PUBLICATIONS

Islam, Mahzabeen, et al. "On-the-fly page migration and address reconciliation for heterogeneous memory systems." ACM Journal on Emerging Technologies in Computing Systems (JETC) 16.1 (2020): 1-27. (Year: 2020).*

(Continued)

*Primary Examiner* — Uyen T Le

(74) *Attorney, Agent, or Firm* — SOROKER AGMON NORDMAN RIBA

(57)                                   ABSTRACT

A computerized-method for prioritizing migration sequence of data files of an application from a source-storage in a source-system to a target-storage in a target-system in a contact center. The computerized-method includes a) for each data file with customers interactions data in the source-storage that has been marked for migration: (i) retrieving metadata of the file; (ii) retrieving agents details; (iii) identifying attributes related to customers interactions operations in the metadata of the file; (iv) receiving a configuration of weights and rules files. The configuration of weights and rules files includes attribute-type associated to each attribute, (v) normalizing value of each attribute based on a preconfigured formula that is related to the associated attribute-type; and (vi) operating a file-priority-score module to score priority of the file based on the normalized value of each attribute in the attributes; and b) migrating files to the target-storage based on their score of priority.

12 Claims, 18 Drawing Sheets

(56) References Cited

U.S. PATENT DOCUMENTS

| | | | | |
|---|---|---|---|---|
| 2023/0297417 A1* | 9/2023 | Ali | | G06F 3/067 |
| | | | | 718/102 |
| 2024/0264982 A1* | 8/2024 | Venkatesh | | G06F 16/1734 |

OTHER PUBLICATIONS

Nguyen, Tien-Dung, et al. "An improvement of resource allocation for migration process in cloud environment." The Computer Journal 57.2 (2014): 308-318. (Year: 2014).*

* cited by examiner

Figure 2A:
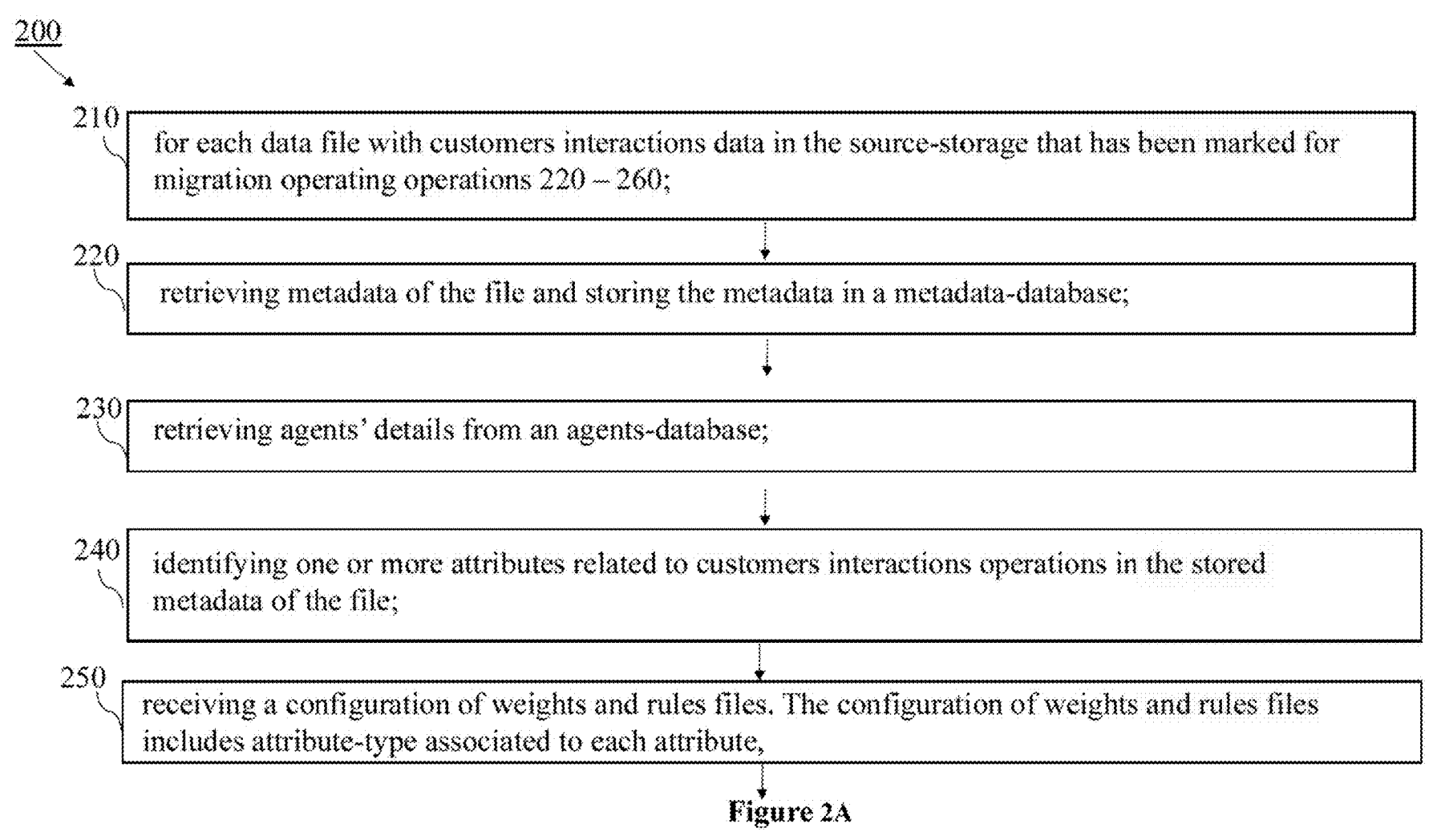

210 — for each data file with customers interactions data in the source-storage that has been marked for migration operating operations 220 — 260;

220 — retrieving metadata of the file and storing the metadata in a metadata-database;

230 — retrieving agents' details from an agents-database;

240 — identifying one or more attributes related to customers interactions operations in the stored metadata of the file;

250 — receiving a configuration of weights and rules files. The configuration of weights and rules files includes attribute-type associated to each attribute,

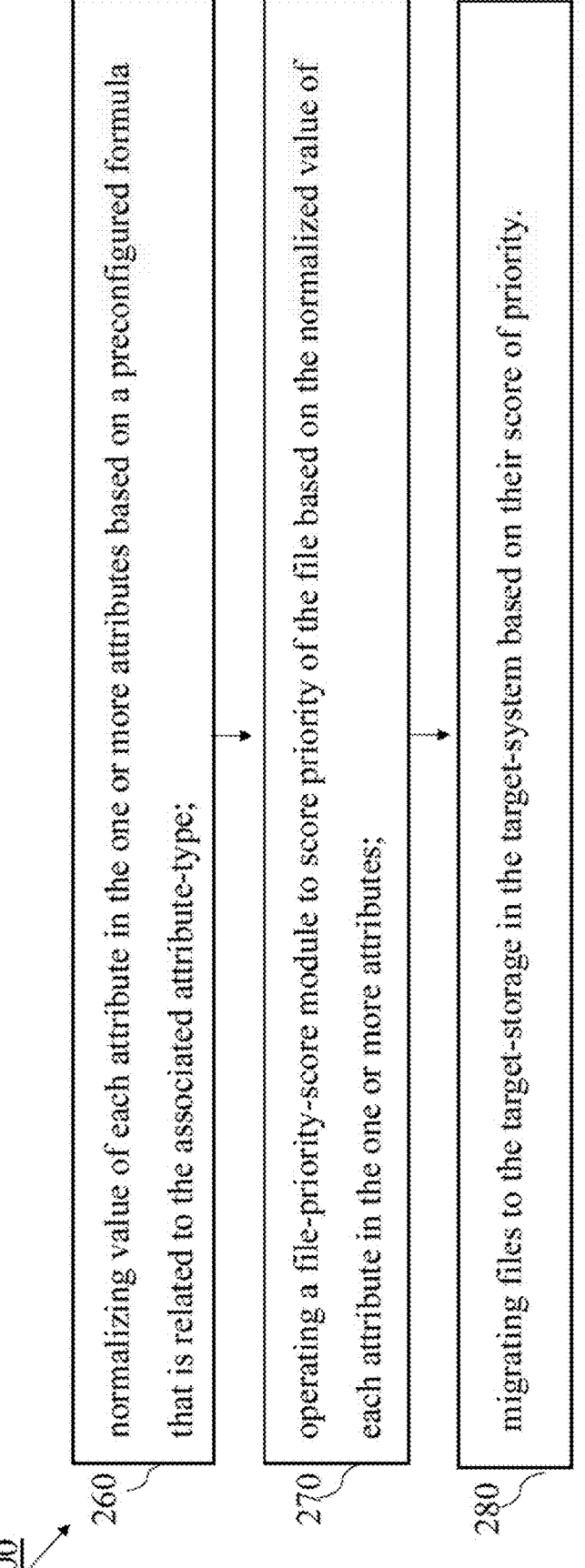

260 normalizing value of each attribute in the one or more attributes based on a preconfigured formula that is related to the associated attribute-type;

270 operating a file-priority-score module to score priority of the file based on the normalized value of each attribute in the one or more attributes;

280 migrating files to the target-storage in the target-system based on their score of priority.

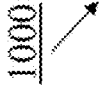

| Attribute | Explanation | Category | Default Weight |
|-----------|-------------|----------|----------------|
| 1 Tenant tier | Tenants are ranked as per their priority and tier. Tier 1 tenants are given higher priority and are ranked nearer to 1. | Minimization | 0.4 |
| 2 File Type | The File type represents the Communication channel for the file. Files are ranked by Default based on typical Contact Center use case. Please refer to the table Error! Reference source not found. below for the proposed default ranking. | Minimization | 0.25 |
| 3 File Size | Represents the size of the file in megabytes. Smaller files are preferred to be migrated earlier. | Minimization | 0.15 |
| 4 Interaction Duration (Current Date – Contact Start Date) | This property reflects the days since the file was created. All Contact Center files (Agent/Customer) that are related to recent Interactions are preferred to be migrated earlier. | Minimization | 0.1 |
| 4.1 Days since last accessed (Current Date – Access Date) | Represents the days since the file was last accessed. Files which are accessed more recently are preferred to be migrated earlier. | Maximization | 0.06 |
| 5 Access Frequency | Represents the number of times a file is accessed. Files which are accessed more, are preferred to be migrated earlier. | Maximization | 0.03 |
| 6 Agent or Team | Files associated to priority Agents or Teams/Leads are preferred to be migrated earlier. | Minimization | 0.01 |

Figure 11:
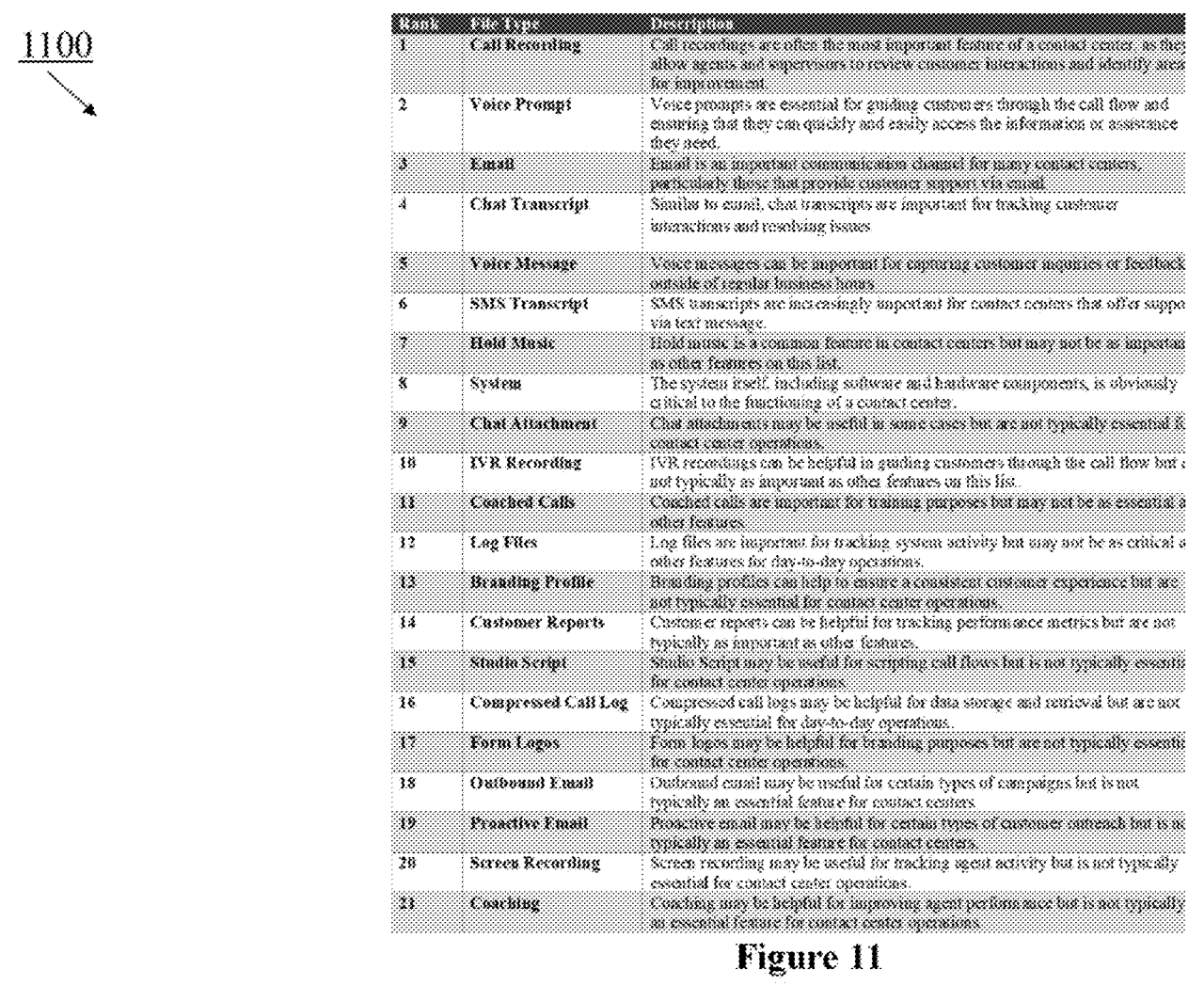

| Item | File Type | Description |
|---|---|---|
| 1 | Call Recording | |
| 2 | Voice Prompt | |
| 3 | Email | |
| 4 | Chat Transcript | |
| 5 | Voice Message | |
| 6 | SMS Transcript | |
| 7 | Hold Music | |
| 8 | System | |
| 9 | Chat Attachment | |
| 10 | IVR Recording | |
| 11 | Coached Calls | |
| 12 | Log Files | |
| 13 | Routing Profile | |
| 14 | Customer Reports | |
| 15 | Static Script | |
| 16 | Compressed Call Log | |
| 17 | Form Logs | |
| 18 | Outbound Email | |
| 19 | Proactive Email | |
| 20 | Screen Recording | |
| 21 | Coaching | |

| File Type | Size (GB) | Days since created | Days since accessed | Access Frequency | Access Frequency | Read/Write Count | RTR Policy Score |
|---|---|---|---|---|---|---|---|
| 1 Call Recording | 2 | 1 | 1 | 1 | 2 | 1 | 0.923 |
| 2 Call Recording | 0.5 | 1 | 1 | 1 | 10 | 1 | 0.908 |
| 1 Chat Transcript | 1 | 1 | 1 | 1 | 2 | 1 | 0.878 |
| 3 Call Recording | 0.5 | 5 | 5 | 3 | 1 | 1 | 0.821 |
| 2 SMS Transcript | 0.1 | 3 | 3 | 3 | 2 | 2 | 0.8071 |
| 2 System files | 5 | 0 | 0 | 0 | 10 | 0 | 0.805 |
| 1 Coaching | 2 | 10 | 10 | 10 | 10 | 1 | 0.675 |

Figure 15

SYSTEM AND METHOD FOR PRIORITIZING MIGRATION SEQUENCE OF DATA FILES OF AN APPLICATION FROM A SOURCE-STORAGE IN A SOURCE-SYSTEM TO A TARGET-STORAGE IN A TARGET-SYSTEM IN A CONTACT CENTER

COPYRIGHT NOTICE

TECHNICAL FIELD

The present disclosure relates to the field of prioritizing migration sequence of data files of an application from a source-storage in a source-system to a target-storage in a target-system in a contact center.

BACKGROUND

Data migration includes moving data, applications or other business elements to another environment. For example, cloud computing environment. The purpose of the data migration may be reducing costs associated with storage and IT equipment, expanding and scaling storage capacity, improving application performance and user experience, centralizing and simplifying data management and meeting new compliance or security requirements.

Some challenges related to data migration may be ensuring data integrity and security during the transfer, minimizing downtime and disruption to business operations, handling large volumes of data efficiently and combining on-premises infrastructure with public cloud resources.

As contact centers implement cloud services and migrate data of applications the to a computing environment, 33% of organizations see migration time as their biggest concern, with projects often exceeding budgets and timelines. A 2019 survey by Ovum found that data migration is a major challenge for organizations when shifting to cloud-based contact centers.

Data migration requires data retrieval from the source system and then transforming the data by cleaning, formatting and converting it. Then, the transformed data is loaded into the target system.

Transitioning data from one source to another is not an easy task for businesses that daily collect big volumes of structured and unstructured data. According to Oracle, more than 80% of data migration projects fail to meet deadlines or stick to the budget. One of the top four reasons for this happening is that companies neglect data migration challenges and cannot handle the damage these risks bring to their projects. The biggest challenges for migration are in the amount of time it takes for the migration based on the amount of data and the connection bandwidth, allowing for continuing operations during migration, and migration of various data types generated in contact center interactions and files.

Outdated technology may create poor customer experiences. Contact centers implement technologies to ensure business continuity, build resilience, save costs, and gain new efficiencies. The top barriers to cloud migration were centered on existing on-premises contact center investments and security concerns, as well as a resistance to change. A survey found that 31% of consumers have switched brands because a company was lying about product performance (YouGov). 61% of customers say that they would switch to a competitor after only one bad experience. In the case of more than one bad experience, this increases to 80%.

When one the oldest and largest U.S. financial institutions faced regulatory penalties because of its end-of-support infrastructure and application, migrating its contact center to the cloud helped it regain regulatory compliance while improving interactive voice response (IVR) containment and reducing associate training time.

Many times, when switching to a new system the mission-critical data is missing to manage multichannel customer interaction from both customer and agent perspective. Losing business functionalities is often a significant data migration challenge. Company employees and customers may quickly become frustrated by slow-to-respond programs. In addition, data migration solutions that don't involve business users in every step often result in application errors and inefficiencies.

Accordingly, there is a need for a technical solution to smoothly switch to the new system without breaking or disrupting processes and services that have been working well enough for many years and even decades. Mission Critical data missing leads to frustrating employees during the transition phase. They get frustrated as they can't solve customers' problems. According to survey by Frost & Sullivan group, 48% of organizations face this, due to unworkable customer journeys or data which leads to reputational impact, and loss of revenue.

Businesses struggle with limited control and 72% lack awareness of their data, hindering targeted migration and hindering future adaptability. Uncertainty may stagnate a cloud contact center migration strategy.

There is a need for system and method that will prioritize the data migration sequence based on usage criticality and business importance using historical and real-time data analytics and makes an informed decision during the migration of the data.

SUMMARY

There is thus provided, in accordance with some embodiments of the present disclosure, a computerized-method for prioritizing migration sequence of data files of an application from a source-storage in a source-system to a target-storage in a target-system in a contact center.

Furthermore, in accordance with some embodiments of the present disclosure, the computerized-method may include: a) for each data file with customers interactions data in the source-storage that has been marked for migration: (i) retrieving metadata of the file and storing the metadata in a metadata-database; (ii) retrieving agents details from an agents-database; (iii) identifying one or more attributes related to customers interactions operations in the stored metadata of the file and agents' details; (iv) receiving a configuration of weights and rules files. The configuration of weights and rules files includes attribute-type associated to each attribute, (v) normalizing value of each attribute in the one or more attributes based on a preconfigured formula that is related to the associated attribute-type; and (vi) operating a file-priority-score module to score priority of the file based on the normalized value of each attribute in the one or more attributes; and b) migrating files to the target-storage in the target-system based on their score of priority.

Furthermore, in accordance with some embodiments of the present disclosure, the attributes related to customers interactions operations may include at least one of: (i) file type; (ii) file size; (iii) interaction duration; (iv) file age; (v) period since last accessed; (vi) access frequency; (vii) agent; and (viii) team, and the agents details include for each agent at least one of: (i) agent team priority; and (ii) agent proficiency level.

Furthermore, in accordance with some embodiments of the present disclosure, the data migration may be to a cloud storage and the contact center may be a cloud-based contact center. The attributes related to customers interactions operations further include tenant tier and tenant size.

Furthermore, in accordance with some embodiments of the present disclosure, the computerized-method may further include retrieving tenant tier and tenant size from a tenant-metadata database.

Furthermore, in accordance with some embodiments of the present disclosure, the attribute-type is one of: (i) maximization-attribute; and (ii) minimization-attribute.

Furthermore, in accordance with some embodiments of the present disclosure, the files in the source-storage with customers interactions data that has been marked for migration are files that have been generated during a preconfigured period.

Furthermore, in accordance with some embodiments of the present disclosure, the configuration of weights and rules files further includes a weight associated to each attribute in the one or more attributes, and the file-priority-score module may include: (i) calculating a weighted product of each normalized value of the attribute in the one or more attributes based on the associated weight; and (ii) calculating a sum of weighted products of the one or more attributes to yield a score to the file. Each attribute may be assigned a default weight, and the weighted product may be calculated accordingly.

Furthermore, in accordance with some embodiments of the present disclosure, the attribute-type and weight associated to each attribute in the configuration of weights and rules files determine a level of significance and usage criticality of the file during customers interactions operations.

Furthermore, in accordance with some embodiments of the present disclosure, the computerized-method may further include operating the application via the target-system after a preconfigured number of data files from all data files in the source-storage have been migrated to the target-storage.

Furthermore, in accordance with some embodiments of the present disclosure, the computerized-method may further include checking operation of the application with the preconfigured number of files that have been migrated to the target-storage. The checking may include: (i) operating the application for a preconfigured subset of customers; (ii) testing the application by operating at least one of: a. data integrity tests; and one or more recommended tests; (iii) determining a failure migration of the preconfigured number of files that have been migrated to the target-storage when the data integrity tests have failed and when the data integrity tests were successful, and the one or more recommended tests have failed; and (iv) determining a successful migration of the preconfigured number of files that have been migrated to the target-storage when the data integrity tests, and one of the one or more recommended tests have been successful.

Furthermore, in accordance with some embodiments of the present disclosure, the one or more recommended tests may include: a. core functionality tests; b. performance testing; and c. user experience testing.

Furthermore, in accordance with some embodiments of the present disclosure, when determining the failure migration, the computerized-method may further include stopping the migrating files to the target-storage in the target-system based on their score of priority and operating corrective actions.

BRIEF DESCRIPTION OF THE DRAWINGS

FIGS. 2A-2B are a high-level workflow of a computerized-method for prioritizing migration sequence of data files of an application from a source-storage in a source-system to a target-storage in a target-system in a contact center, in accordance with some embodiments of the present disclosure;

FIG. 10 is a table of attributes considered for calculation of the file priority score, in accordance with some embodiments of the present disclosure;

FIG. 11 is a table of file type classification, in accordance with some embodiments of the present disclosure;

FIG. 15 is a table of simulation results with the calculated file priority score of each file type, in accordance with some embodiments of the present disclosure.

DETAILED DESCRIPTION

Figure 1:
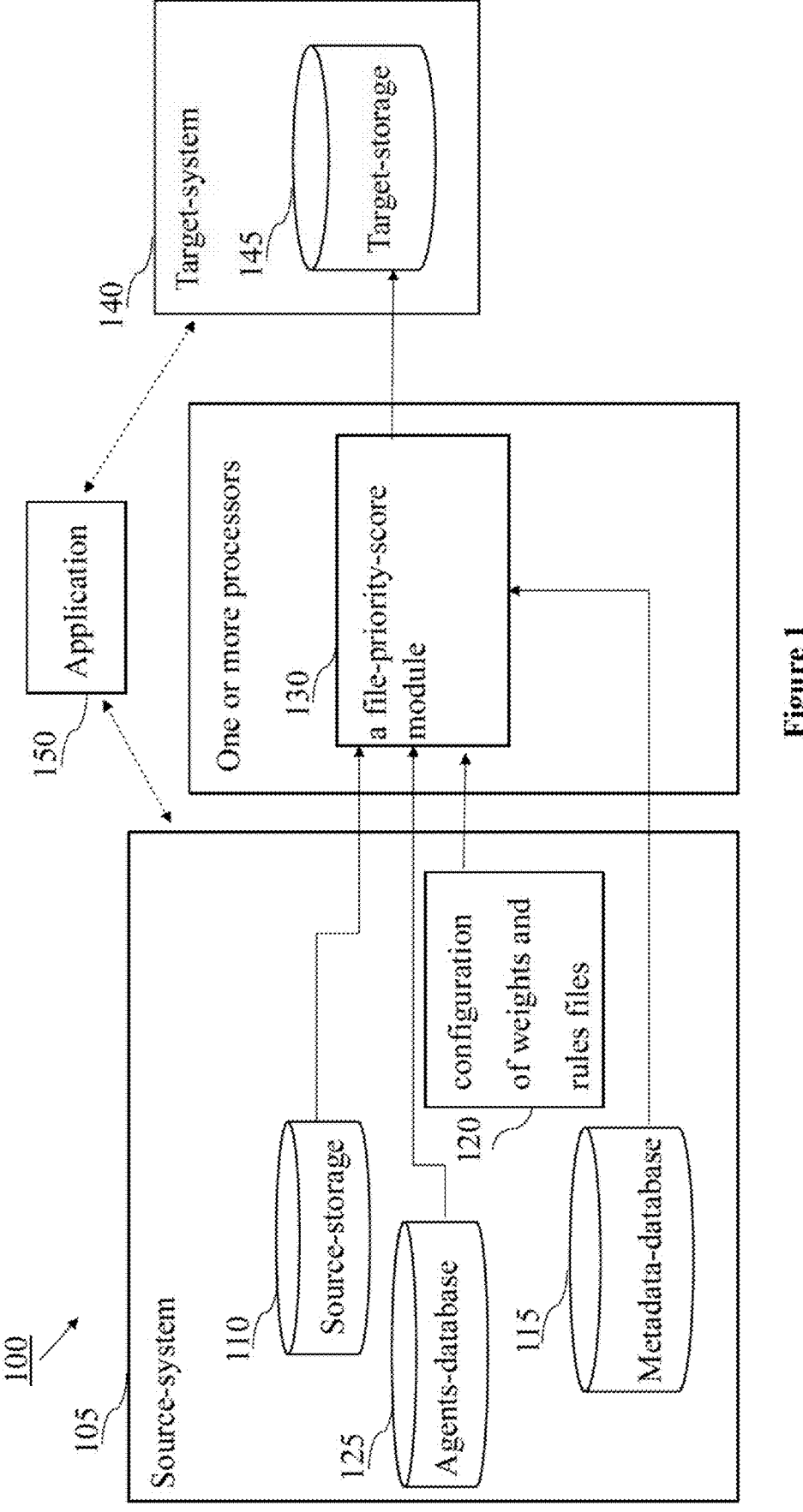
FIG. 1 schematically illustrates a high-level diagram of a system for prioritizing migration sequence of data files of an application from a source-storage in a source-system to a target-storage in a target-system in a contact center, in accordance with some embodiments of the present disclosure.

In the following detailed description, numerous specific details are set forth in order to provide a thorough understanding of the disclosure. However, it will be understood by those of ordinary skill in the art that the disclosure may be practiced without these specific details. In other instances, well-known methods, procedures, components, modules, units and/or circuits have not been described in detail so as not to obscure the disclosure.

Although embodiments of the disclosure are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes.

Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

The term 'Agent' as used herein refers to the contact center personnel who handled the interaction stored in the file being migrated. Various attributes related to the agent may be considered, such as, related team and skills.

Current contact centers are making great efforts to adopt new contact center solutions which involve contact center data migration from current system to the target system. Outdated technology may cause poor customer experiences. Contact center migration is now a priority for many organizations. Today, businesses undertake different types of data center modernization to ensure business continuity, build resilience, save costs, and gain new efficiencies.

Top barriers to data migration and particularly to cloud migration were centered on existing on-premises contact center investments and security concerns, as well as a resistance to change. A survey found that 31% of consumers have switched brands because a company was lying about product performance. 61% of customers say that they would switch to a competitor after only one bad experience. In the case of more than one bad experience, this increases to 80%.

There are also costs associated with a lack of agility to shift easily with market changes, including the recent economic downturn, or internal shifts in strategy, such as delaying migration with the same outcome. Higher costs, a less competitive business and an impact to the brand.

When one of the oldest and largest U.S. financial institutions faced regulatory penalties because of its end-of-support infrastructure and application, migrating its contact center to the cloud helped it regain regulatory compliance while improving interactive voice response (IVR) containment and reducing associate training time.

Losing business functionalities is often a significant data migration challenge. Company employees and customers can quickly become frustrated by slow-to-respond programs. In addition, data migration solutions that don't involve business users in every step often result in application errors and inefficiencies.

Current solutions for data migration include manual data migration, scripted migration, commercial migration tools and cloud migration services. Manual data migration involves manual transferring of data from the source system to the target system. While simple, it is time-consuming, error-prone, and does not prioritize files based on their importance or relevance. Scripted migration involves writing scripts or code to automate parts of the migration process. While more efficient than manual migration, it still lacks the ability to prioritize files based on their significance and adapt to changing priorities. Commercial migration tools that offer automated data migration capabilities often provide basic functionality for transferring data but may not offer advanced prioritization or customization options. Cloud migration services offered by some cloud service providers to help businesses move their data to the cloud computing environment. While these services can be efficient, they may not prioritize files based on their importance or adapt to the specific needs of contact center data migration.

While these existing solutions offer some level of automation and efficiency, they often lack the advanced prioritization, dynamic adaptability, and customization capabilities.

There is a need for a technical solution to smoothly make the move without breaking or disrupting processes and services that have been working well enough for many years, even decades. When mission critical data is missing it may lead to frustrating employees during the transition phase. They get frustrated as they can't solve customers' problems due to unworkable customer journeys or data which leads to reputational impact, and loss of revenue.

Businesses struggle with limited control and a major portion of them lack awareness of their data, hindering targeted migration and hindering future adaptability. Uncertainty stagnates a cloud contact center migration strategy, which may be a costly mistake. Not migrating the data may have financial implications and it may halt the ability to innovate.

Instead of spending months on drafting data migration strategy, there is a need for a technical solution that will provide the ability to prioritize the data migration sequence based on usage criticality and business importance using historical and real-time data analytics and will make an informed decision during the migration of the data.

There is a need for a system and method for prioritizing migration sequence of data files of an application from a source-storage in a source-system to a target-storage in a target-system in a contact center. For example, for the following scenarios. When legacy systems become outdated, companies opting for technological advancements. It may be due to better performance and security features, or could be compliance, or cost-related factors. Mergers and acquisitions are also a very common phenomenon in the contact center domain.

FIG. 1 schematically illustrates a high-level diagram of a system 100 for prioritizing migration sequence of data files of an application from a source-storage in a source-system to a target-storage in a target-system in a contact center, in accordance with some embodiments of the present disclosure.

According to some embodiments of the present disclosure, a system, such as system 100 may address shortcomings of current solutions by providing a predictive ranking algorithm tailored for contact center files, dynamic prioritization mechanisms, and advanced automation features. Files that have been marked for migration are evaluated and assigned a priority score based on business needs and predefined criteria which is reflected in attributes and the assigned related weight. Those with higher scores are prioritized and selected for migration first, thus, ensuring an optimized and efficient migration process.

According to some embodiments of the present disclosure, system 100 may prioritize migration sequence of data files of an application 150 from a source-storage 110 in a source-system 105 to a target-storage 145 in a target-system 140 in a contact center. The prioritization may overcome the challenge of losing business functionalities as in current solutions many times, when switching to a new system the mission-critical data is missing to manage multichannel customer interaction from both customer and agent perspective.

According to some embodiments of the present disclosure, unlike many existing data migration solutions that employ generic or one-size-fits-all prioritization methods, system 100 provides a tailored approach. It incorporates a predictive ranking algorithm specifically designed for contact center files, considering attributes such as file size, frequency of access, and relevance to ongoing operations. This customized prioritization ensures that the data migration efforts focus on the most critical data, minimizing disruptions and optimizing efficiency.

According to some embodiments of the present disclosure, system 100 may prioritize the data migration sequence based on usage criticality and business importance using historical and real-time data analytics, e.g., file attributes identified in the metadata and agents details to score the priority of the file during the migration of the data. In a cloud-based environment, tenant tier and size may be included in the attributes of the file.

According to some embodiments of the present disclosure, in a multi-tenant environment tenants may be ranked as per their business value, interaction volumes, and service level agreements (SLAs). This rank may be used during the data migration.

According to some embodiments of the present disclosure, system 100 may calculate the file priority score accordingly, to ensure that critical files from high-value tenants may be migrated first to minimize disruption and maintain service continuity.

According to some embodiments of the present disclosure, for each data file with customers interactions data in the source-storage 110 in the source-system 105 that has been marked for migration retrieving metadata of the file and storing the retrieved metadata in a metadata-database 115.

According to some embodiments of the present disclosure, the retrieved metadata may include basic information, such as file name, file type, file size and location. Date related details, such as creation date, last modified date and last accessed date. Author information, permissions, such as access rights and permissions, who can read, write or execute the file. Technical details, such as duration and bit rate and tags and keywords for categorization and search of the file.

According to some embodiments of the present disclosure, the files in the source-storage 110 with customers interactions data that has been marked for migration may be files that have been generated during a preconfigured period.

According to some embodiments of the present disclosure, agents' details which are related to the data file may be retrieved from an agents-database 125. The agents' details may include for each agent at least one of: (i) agent team priority; and (ii) agent proficiency level.

According to some embodiments of the present disclosure, attributes which are related to customers interactions operations may be identified in the stored metadata of the file and the and agents' details. The attributes may include at least one of: (i) file type; (ii) file size; (iii) interaction duration; (iv) file age; (v) period since last accessed; (vi) access frequency; (vii) agent; and (viii) team.

According to some embodiments of the present disclosure, attributes related to customer interactions may be identified in the stored metadata of the file by analyzing the following key details. File type which indicates the nature of the information stored in the file, such as call recordings, voice prompts, emails, or chat transcripts. The file type helps classify the type of customer interaction being recorded. File size which provides an indication of the duration or complexity of the interaction. For example, larger files may represent lengthier or more detailed customer interactions. File age which may represent the time elapsed since the customer interaction was performed which may be used to understand the relevance and timeliness of the interaction. Download and access frequency which includes metadata on the number of days since the file was last downloaded or accessed, as well as the total number of times the file has been accessed since its creation. This indicates whether a customer interaction needed to be revisited, and how frequently it was referenced.

According to some embodiments of the present disclosure, the calculation of the file priority score of each file may include the rank of the agent and the team which has been retrieved from the agents-database 125.

According to some embodiments of the present disclosure, an agent's team and the proficiency level may be key parameters in determining the final priority score of a file. For example, a file containing interactions handled by the sales team might be assigned a higher priority score due to the potential revenue impact. Similarly, if a technical support team resolves critical technical issues for key customers, interactions from this team will be prioritized higher due to the importance of these resolutions. Likewise, files containing interactions handled by more proficient agents may be considered more valuable because these agents are likely to have resolved complex issues or managed high-value customers effectively. Their insights and resolutions may be more critical for understanding customer behavior or optimizing service quality.

According to some embodiments of the present disclosure, when the data migration is to a cloud storage and the contact center is a cloud-based contact center, the attributes related to customers interactions operations may further include tenant tier.

According to some embodiments of the present disclosure, a configuration of weights and rules files 120 may be retrieved. The configuration of weights and rules files 120 may include an attribute-type associated to each attribute. The attribute-type is one of: (i) maximization-attribute; and (ii) minimization-attribute. Maximization attributes may be attributes that are optimal when maximized or increased. They demonstrate a positive correlation with the file priority score or rank. Minimization attributes may be attributes that may be kept at low values or minimized. They exhibit a negative correlation with the target value, e.g., the file priority score. For example, as shown in table 1000 in FIG. 10.

According to some embodiments of the present disclosure, the configuration of weights and rules files 120 may further include a weight associated to each attribute in the attributes.

According to some embodiments of the present disclosure, the value of each attribute in the attributes may be normalized based on a preconfigured formula that is related to the associated attribute-type, e.g., maximization-attribute and minimization-attribute.

According to some embodiments of the present disclosure, the attributes value may be normalized to a range of '0' to '1'. The attribute-type and weight associated to each attribute in the configuration of weights and rules files 120 may determine a level of significance and usage criticality of the file during customers interactions operations. Values closer to '1' indicate higher priority than values closer to '0'.

According to some embodiments of the present disclosure, a normalized value of an attribute that the attribute-type is minimization-attribute may be calculated according to formula I:

$$normalizedValue \text{ of minimization attribute} = 1 - \frac{R_i - R_{min}}{R_{max} - R_{min}} \quad (I)$$

whereby:

$R_i$ is a value of the attribute A for the given file,
$R_{min}$ is a value of the attribute A for the given file, and
$R_{max}$ is a value of the attribute A for the given file.

According to some embodiments of the present disclosure, a normalized value of an attribute that the attribute-type is maximization-attribute may be calculated according to formula II:

$$normalizedValue \text{ of maximization attribute} = \frac{R_i - R_{min}}{R_{max} - R_{min}} \quad (II)$$

whereby:

$R_i$ is a value of the attribute A for the given file,
$R_{min}$ is a value of the attribute A for the given file, and
$R_{max}$ is a value of the attribute A for the given file.

According to some embodiments of the present disclosure, a module, such as file-priority-score module 130 may be operated to score priority of the file based on the normalized value of each attribute in the attributes.

According to some embodiments of the present disclosure, the file-priority-score module 130 may include calculating a weighted product of each normalized value of the attribute in the attributes based on the associated weight as in the configuration of weights and rules files 120, and then calculating a sum of the weighted products of the attributes to yield a score to the file.

According to some embodiments of the present disclosure, files may be migrated from the source-system 105 to the target-storage 145 in the target-system 140 based on their score of priority.

According to some embodiments of the present disclosure, a weight product may be calculated for each attribute. The File Priority Score (FPS) may be calculated according to formula III:

$$FPS = \sum_{i=1}^{n} (N_i * W_i) \quad (III)$$

whereby:

N is a normalized rank or value of the attribute, and
W is a weight that has been assigned to the attribute.

According to some embodiments of the present disclosure, for example for the attributes listed in table 1000 in FIG. 10:

$$FSP = (N_{accessDate} * W_{accessDate}) + (N_{accessFrequency} * W_{accessFrequency}) +$$
$$(N_{fileType} * W_{fileType}) + (N_{tenant} * W_{tenant}) + (N_{fileSize} * W_{fileSize}) +$$
$$(N_{contactStartDate} * W_{contactStartDate}) + (R_{agentOrTeam} * W_{agentOrTeam})$$

According to some embodiments of the present disclosure, the application may be operated via the target-system 140 after a preconfigured number of data files from all data files in the source-storage 110 have been migrated to the target-storage 145.

According to some embodiments of the present disclosure, the operation of the application with the preconfigured number of files that have been migrated to the target-storage 145 may be checked by operating the application 150 for a preconfigured subset of customers and then testing the application by operating at least one of: a. data integrity tests; and one or more recommended tests. The one or more recommended tests may include: a. core functionality tests; b. performance testing; and c. user experience testing.

According to some embodiments of the present disclosure, a failure migration of the preconfigured number of files that have been migrated to the target-storage 145 may be determined when the data integrity tests have failed or when the data integrity tests were successful, but the one or more recommended tests have failed.

According to some embodiments of the present disclosure, when a failure migration may be determined, the migration of the file to the target-storage 145 in the target-system 140 may be stopped based on their score of priority and corrective actions may be operated, such as rollback procedure.

According to some embodiments of the present disclosure, a successful migration of the preconfigured number of files that have been migrated to the target-storage 145 when the data integrity tests, and one of the one or more recommended tests have been successful.

According to some embodiments of the present disclosure, system 100 may automate the identification and evaluation of file importance, as well as the prioritization of migration tasks, thus reducing manual effort required for the data migration. The automation may enhance efficiency, minimize the risk of errors, and accelerate the overall data files migration process.

According to some embodiments of the present disclosure, system 100 may be designed to be scalable and adaptable to various contact center environments. It can accommodate the diverse needs and requirements of different organizations, from small-scale operations to large enterprises. Additionally, the customization capabilities of our invention ensure that it can be seamlessly integrated into existing workflows, maximizing its effectiveness and value.

According to some embodiments of the present disclosure, the starting point may be a preconfigured number of files from the data files with customers interactions data in the source-storage that has been marked for migration, e.g., 5% of the total files available for migration. This could then be further configured based on the nature of the contact center business. System 100 may ensure that the most critical files are prioritized and migrated first. Once these key data files are transferred, the target-system 140 may be ready to begin operation of the application 150.

According to some embodiments of the present disclosure, when the preconfigured number of files from the data files with customers interactions data in the source-storage that has been marked for migration have been migrated to the target-system 140 an evaluation may start by operating the application 150 via the target-system 145. The first evaluation may be focused on functions essential for basic customer service and may be operated several times during the migration process. Each time critical workflows may be added to the evaluation.

According to some embodiments of the present disclosure, the checking of the data migration may be implemented as a phased rollout approach, based on the percentage of migrated files.

According to some embodiments of the present disclosure, for example, in 25% migration: Once 25% of the overall files have been migrated, the application enters an initial evaluation phase. This phase involves going live for a limited subset of customers, focusing on core contact center functions essential for basic customer service. The goal is to verify the system's ability to handle basic interactions and confirm that essential features are operational. During this phase, any detected issues or missing functionality are logged for resolution.

According to some embodiments of the present disclosure, for example, in 50% migration when 50% of the files have been migrated, the application begins supporting the majority of critical workflows. The system is further tested under heavier loads, with an emphasis on more advanced scenarios and interactions. At this stage, minor disruptions or challenges in specific use cases may arise and are addressed to ensure minimal impact on ongoing operations.

According to some embodiments of the present disclosure, for example, in 75% migration the new system may be fully operational and used as the primary mode of operation for the contact center. Most business processes, from customer interactions to reporting, are tested and verified end-to-end. While rare cases involving historical or complex data may still encounter issues, the system is expected to handle the vast majority of workflows without disruption.

According to some embodiments of the present disclosure, actions based on checking results may be for example, only if unexpected errors, data integrity issues, or performance bottlenecks are detected at initial stage 25% initiating a 'fail fast and fail safe' partial rollback procedure to revert the migration of affected files and allow further refinement of the migration process. If the system meets predefined performance benchmarks and passes quality checks, the migration proceeds to the next phase, with the eventual goal of migrating 100% of the data and fully decommissioning the source-storage.

According to some embodiments of the present disclosure, the term "fail fast and fail safe" refers to a strategy used in systems or processes to detect and handle failures quickly and efficiently, minimizing the impact of such failures. Fail Fast: the system is designed to detect potential issues as early as possible, ideally at the initial stages, e.g., during the first 25% of the migration process. If there are unexpected errors, data integrity issues, or performance bottlenecks occur, the system quickly identifies and acknowledges the problem, preventing it from cascading and affecting the entire process. This allows for early termination of faulty operations, minimizing wasted resources and reducing the complexity of recovery.

According to some embodiments of the present disclosure, Fail Safe: once a failure is detected, the system takes actions to prevent further damage or disruption. In this case, it initiates a partial rollback procedure. The rollback reverts the migration of affected files back to their original state in the source-storage, ensuring that no permanent damage is done to the data or system functionality. This approach safeguards the system, allowing it to return to a safe state and enabling further refinement or corrections to be made before retrying the migration process. By combining fail fast and fail safe, the process ensures that any issues are caught and addressed early, while also protecting the system from long-term disruptions, allowing the migration to proceed smoothly after the problem is resolved.

According to some embodiments of the present disclosure, once a preconfigured percentage of files e.g., 25%, 50%, and the like have been migrated to the target-storage 145, the application 150 may be operational for a specific, controlled subset of customers to ensure stability, performance, and integrity before a broader rollout.

According to some embodiments of the present disclosure, the one or more recommended tests may include core functionality tests, performance testing, user experience testing and system compatibility testing.

According to some embodiments of the present disclosure, data integrity tests may ensure that the migrated files retain their original content, structure, and metadata, and that no data has been lost or corrupted during the migration process.

According to some embodiments of the present disclosure, successful migration may be determined when all migrated files are complete with no missing or altered content and can be accessed without errors.

According to some embodiments of the present disclosure, failure migration may be determined when any file is found to be incomplete, corrupted, or missing critical metadata, leading to incorrect application behavior According to some embodiments of the present disclosure, the core functionality tests may check if key business functions e.g., customer interactions, reporting, and data retrieval, within the application 150 are operating correctly after migration for the selected subset of customers.

According to some embodiments of the present disclosure, a successful migration may be determined when the application performs within acceptable thresholds, including fast response times, low latency, and efficient resource use, even during peak traffic.

According to some embodiments of the present disclosure, a failure migration may be determined when the system experiences performance degradation, high latency, or crashes under load, preventing effective customer service.

According to some embodiments of the present disclosure, the user experience testing may check the usability and responsiveness of the application for agents and end-users, particularly when accessing migrated files and performing customer-related operations.

According to some embodiments of the present disclosure, a successful migration may be determined when agents and users can smoothly interact with the system without noticeable issues, such as slow load times, errors, or missing data.

According to some embodiments of the present disclosure, a failure migration may be determined when user-facing errors, poor system performance, or difficulty accessing necessary data results in a degraded user experience.

According to some embodiments of the present disclosure, the system compatibility testing may check that the migrated data integrates well with other systems or modules that rely on this information, such as analytics, customer databases, or reporting tools.

According to some embodiments of the present disclosure, a successful migration may be determined when the migrated data is compatible with downstream systems, and those systems function correctly without errors or interruptions.

According to some embodiments of the present disclosure, a failure migration may be determined when data incompatibilities cause issues in dependent systems, resulting in errors or incomplete workflows.

According to some embodiments of the present disclosure, if the application passes the data Integrity test and any additional recommended tests e.g., core functionality tests, performance testing, user experience testing and compatibility test, the migration is considered successful, and the process can move to the next phase with a larger percentage of customers and files.

According to some embodiments of the present disclosure, if any critical issues or data inconsistencies are detected during testing, corrective actions may be taken, such as partial rollback or re-migration of affected files. Fixes are implemented before proceeding with further migrations.

FIGS. 2A-2B are a high-level workflow of a computerized-method for prioritizing migration sequence of data files of an application from a source-storage in a source-system to a target-storage in a target-system in a contact center, in accordance with some embodiments of the present disclosure;

According to some embodiments of the present disclosure, operation 210 comprising for each data file with customers interactions data in the source-storage that has been marked for migration operating operations 220-260.

According to some embodiments of the present disclosure, operation 220 retrieving metadata of the file and storing the metadata in a metadata-database.

According to some embodiments of the present disclosure, operation 230 retrieving agents' details from an agents-database.

According to some embodiments of the present disclosure, operation 240 identifying one or more attributes related to customers interactions operations in the stored metadata of the file.

According to some embodiments of the present disclosure, operation 250 receiving a configuration of weights and rules files. The configuration of weights and rules files includes attribute-type associated to each attribute.

According to some embodiments of the present disclosure, operation 260 normalizing value of each attribute in the one or more attributes based on a preconfigured formula that is related to the associated attribute-type.

According to some embodiments of the present disclosure, operation 270 operating a file-priority-score module to score priority of the file based on the normalized value of each attribute in the one or more attributes.

According to some embodiments of the present disclosure, operation 280 migrating files to the target-storage in the target-system based on their score of priority.

Figure 3:
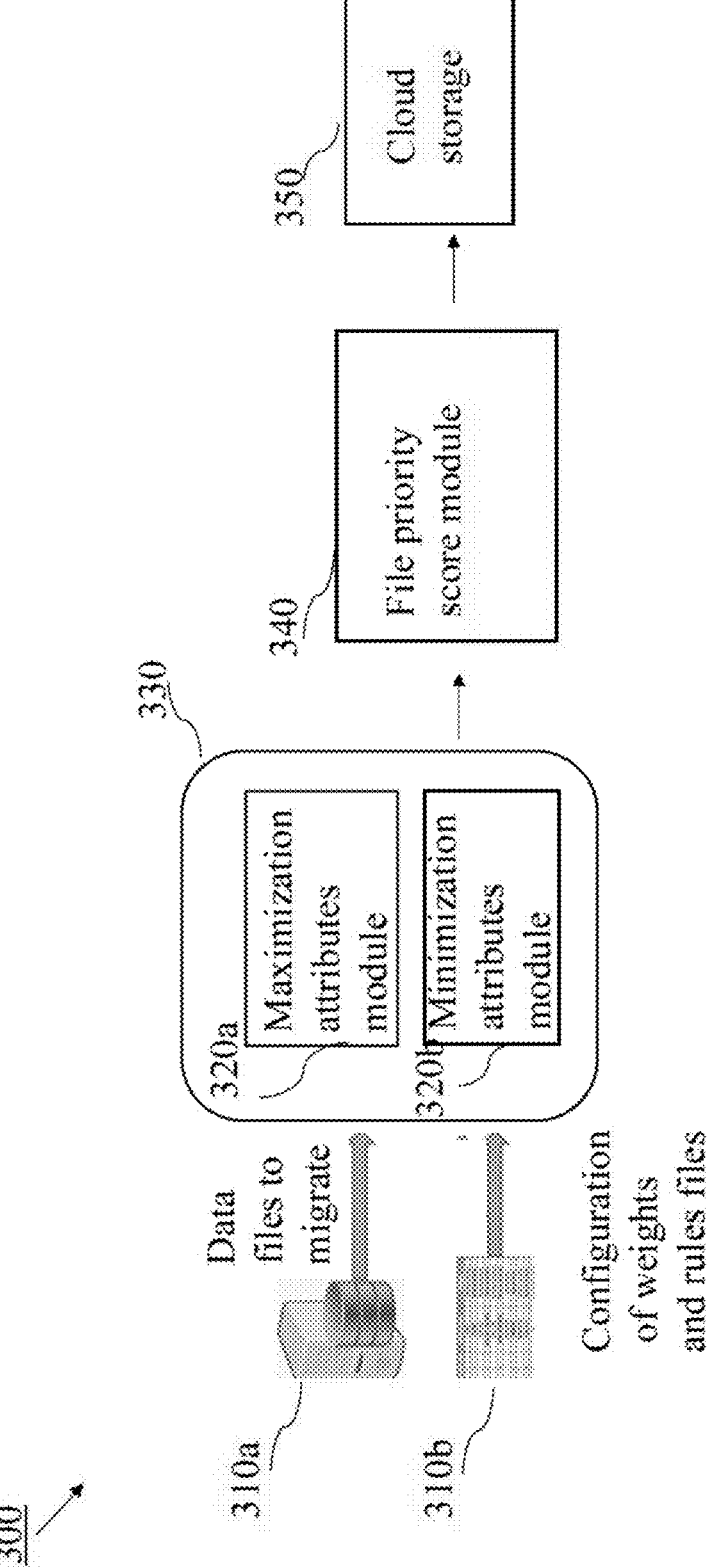
FIG. 3 schematically illustrates a high-level diagram of a system for prioritizing migration sequence of data files of an application from a source-storage in a source-system to a target-storage in a target-system in a contact center, in accordance with some embodiments of the present disclosure.

FIG. 3 schematically illustrates a high-level diagram of a system 300 for prioritizing migration sequence of data files of an application from a source-storage in a source-system to a target-storage in a target-system in a contact center, in accordance with some embodiments of the present disclosure.

According to some embodiments of the present disclosure, in a system, such as system 100, the data may be retrieved from the source-database of the source-system. Then, the data may be transformed. The data is cleaned, formatted, and converted as needed. The transformed data may be loaded into the target-system. The extraction process of running a priority tagging algorithm on source data to make sure that the most important data of the business gets migrated early so that they can test the workflows and go live as early.

According to some embodiments of the present disclosure, in system 100 in FIG. 1, scanning data files to migrate 310a with all customers' recently generated customer interaction data and historical file metadata to analyze the nature of the files to be migrated. Attributes that may be mission-critical may be identified and based on these attributes files may be classified into two groups of maximization attributes 320a and minimization attributes 320b to calculate an attribute-based scoring for each file. A file priority score module 340 may calculate for each file a priority score for migration.

According to some embodiments of the present disclosure, a file migration pipeline sequence may be generated. Following this, contact center owners can save go-live time by ensuring that only necessary files are migrated and enabling the businesses to make the transition to the target-system in reduce amount of time, e.g., quarter of non-prioritized migration time.

According to some embodiments of the present disclosure, system can be customized and tailored to meet the migration needs of each organization. This gives brands more choices, as well as the ability to toggle and pivot quickly to meet ever-changing contact center needs. Companies don't have to figure it out on their own; working with a default algorithm can help. There's no need to start from scratch when a partner can bring in crucial experience, insights, and expertise.

Figure 4:
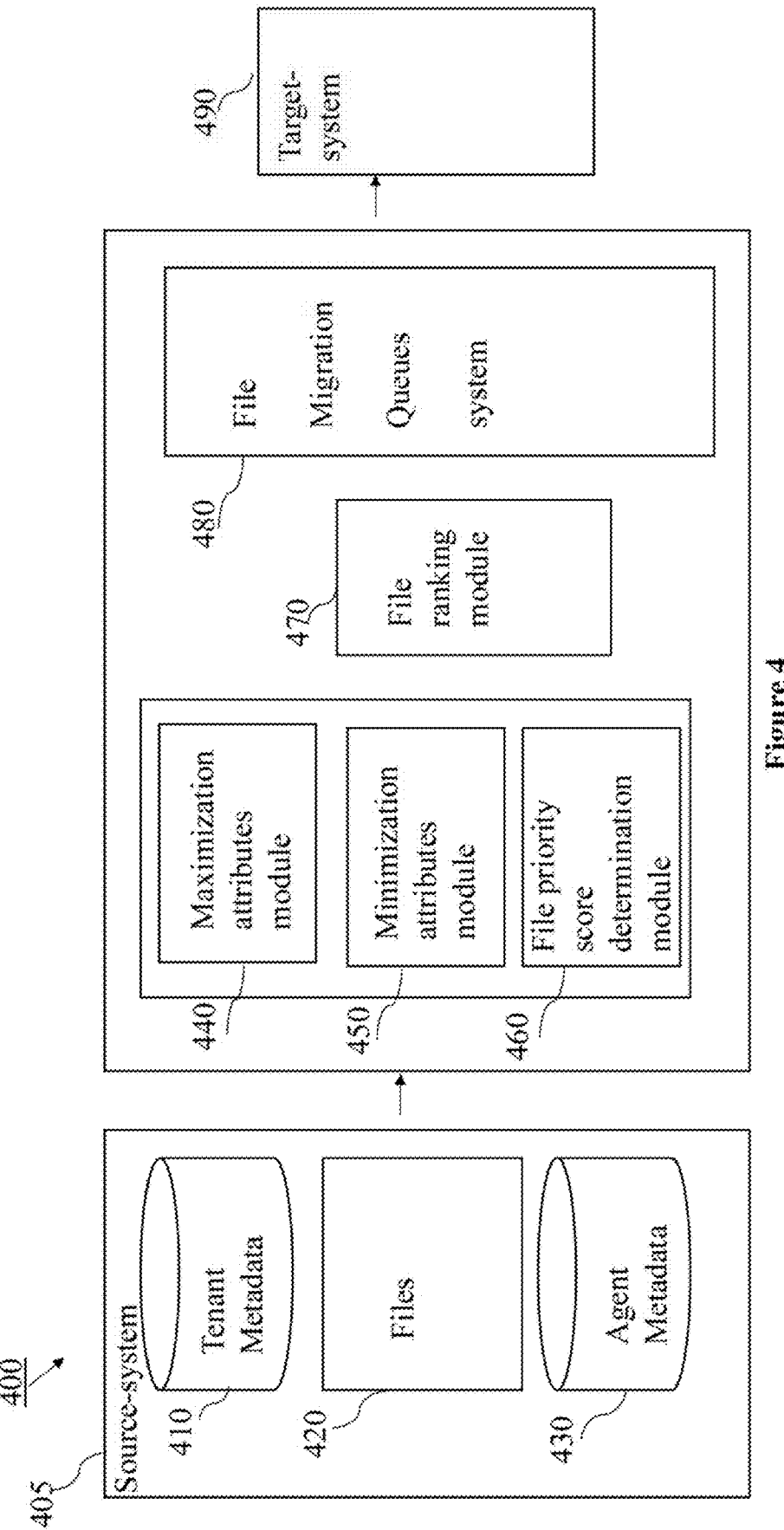
FIG. 4 schematically illustrates a high-level diagram of a system for prioritizing migration sequence of data files of an application from a source-storage in a source-system to a target-storage in a target-system in a contact center, in accordance with some embodiments of the present disclosure.

FIG. 4 schematically illustrates a high-level diagram of a system 400 for prioritizing migration sequence of data files of an application from a source-storage in a source-system to a target-storage in a target-system in a contact center, in accordance with some embodiments of the present disclosure.

According to some embodiments of the present disclosure, the source-system 405, such as source-system 105 in FIG. 1A, may include a large amount of data e.g., files, for migration to the target-system 490.

There are various reasons why data is migrated. One reason may be technological advancements. Legacy systems may become outdated and lack compatibility with newer technologies. Companies may need better performance and security features, or they may need to comply with new regulations. Second reason may be mergers and acquisitions. Companies that merge or acquire other companies may need to migrate their data to a unified platform. Third reason may be cost factors. Companies may want to migrate their data to a cloud-based platform to save on costs.

According to some embodiments of the present disclosure, migration process e.g., moving data from source-system to a target-system includes extraction, transformation and loading of the data and may be operated by an Extract Transfer Load (ETL) tool. In the extract stage, data is retrieved from the source system 405. A module may scan the source file system or database based on certain predefined attributes. The attributes may be of maximization type or minimization type based on their relevance to priority score for migration. A normalized priority score value may be calculated for each file that has been marked for migration in the source-system 405.

According to some embodiments of the present disclosure, in the transform stage, the data is cleaned, formatted, and converted. This may involve removing duplicate records, filling in missing data, and converting the data to a format that is compatible with the target-system 490.

According to some embodiments of the present disclosure, in the load stage, the transformed data is loaded into the target system. This may involve writing code or calling APIs to insert the data into the target-system.

According to some embodiments of the present disclosure, for an application, such as application 150 in FIG. 1A that is provided as Software as a Service (SAAS) for tenants, the source-system 405 may include three components. A file server 420 which may include the files slated for migration. Additionally, it stores file metadata such as type, size, access date, and frequency. Tenant metadata database 410, contains information about the tenants associated with files in the file server 420. For each tenant, metadata, such as tenant tier and tenant size are stored. The agent metadata may store details about the agents responsible for managing the files. It includes information like team priority and proficiency level for each agent.

Figure 5:
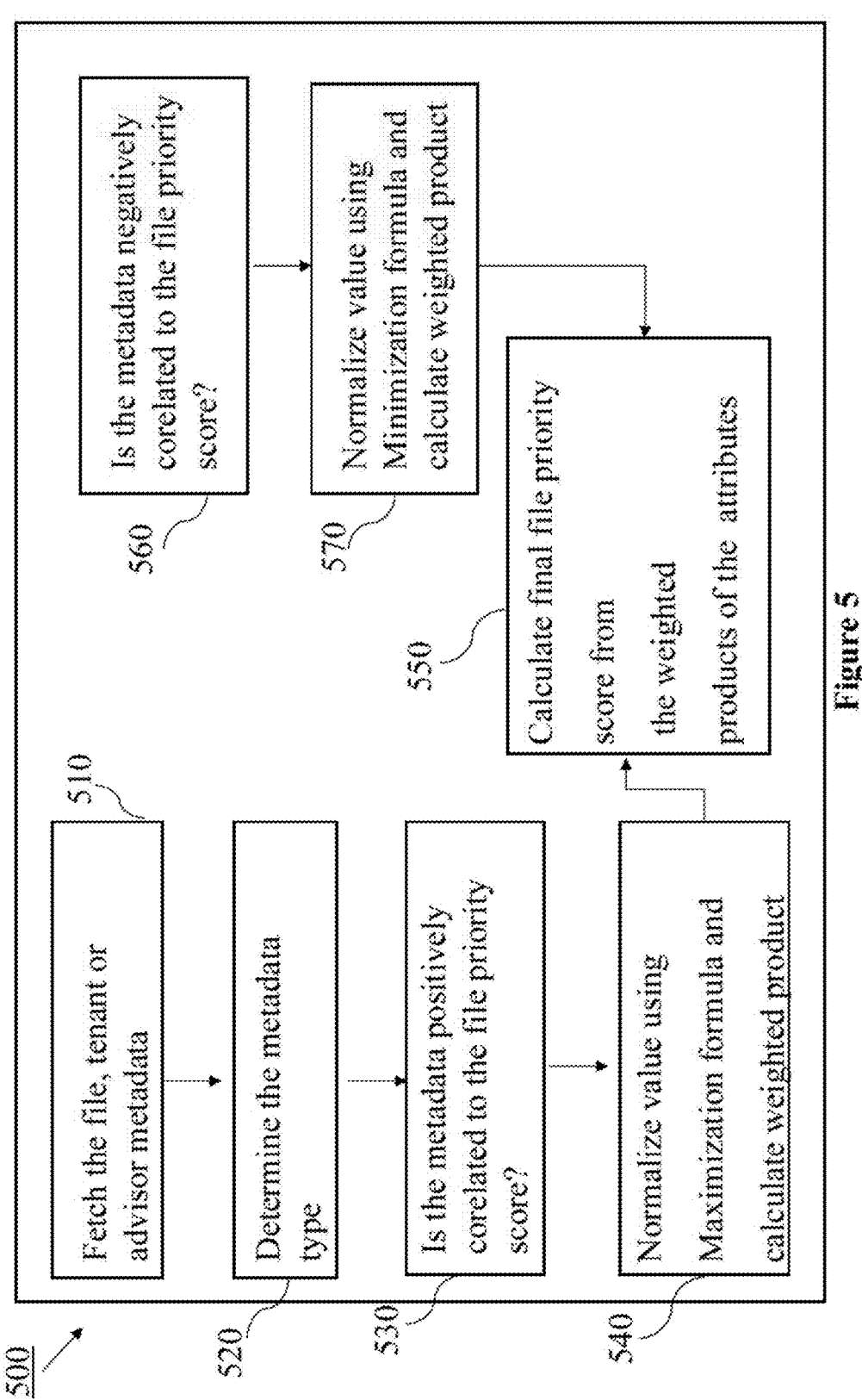
FIG. 5 is a high-level workflow of a file-priority-score module, in accordance with some embodiments of the present disclosure.

According to some embodiments of the present disclosure, the file priority score module 460, such as file-priority-score module 130 in FIG. 1A may calculate the score of priority of each file based on normalized value of each attribute, as shown in FIG. 5. This module computes the file priority Score using the scores from the maximization attribute module 440 and minimization attribute module 450.

According to some embodiments of the present disclosure, the maximization attributes module 440 may normalize values for attributes positively correlated with the file priority score and calculates their weighted product. The minimization attributes module 450 may normalize values for attributes negatively correlated with the file priority score and may calculate their weighted product.

Figure 6:
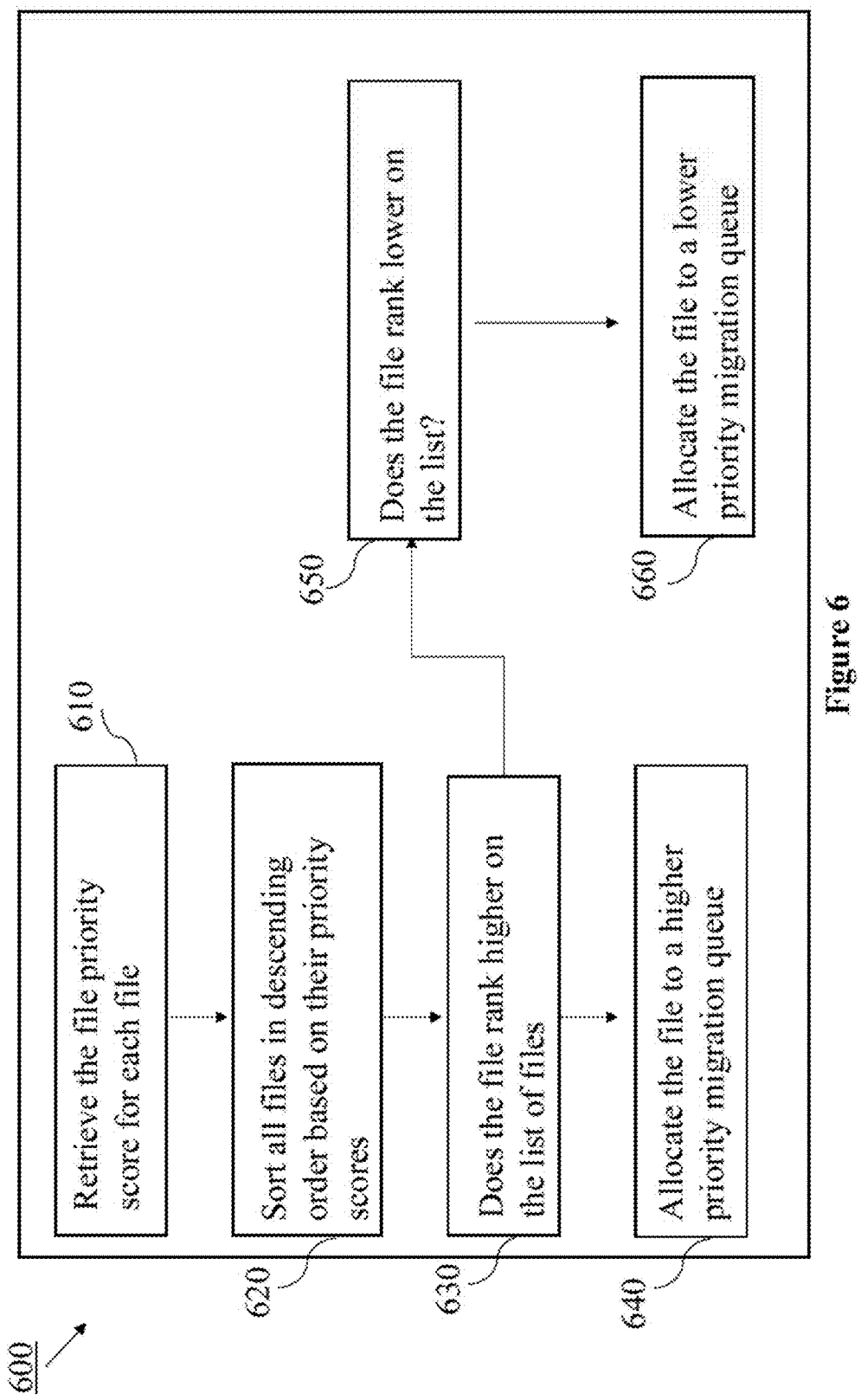
FIG. 6 is a high-level workflow of a file ranking module, in accordance with some embodiments of the present disclosure.

According to some embodiments of the present disclosure, the file ranking module may rank all files for migration based on their calculated priority score, as shown in FIG. 6.

Figure 7:
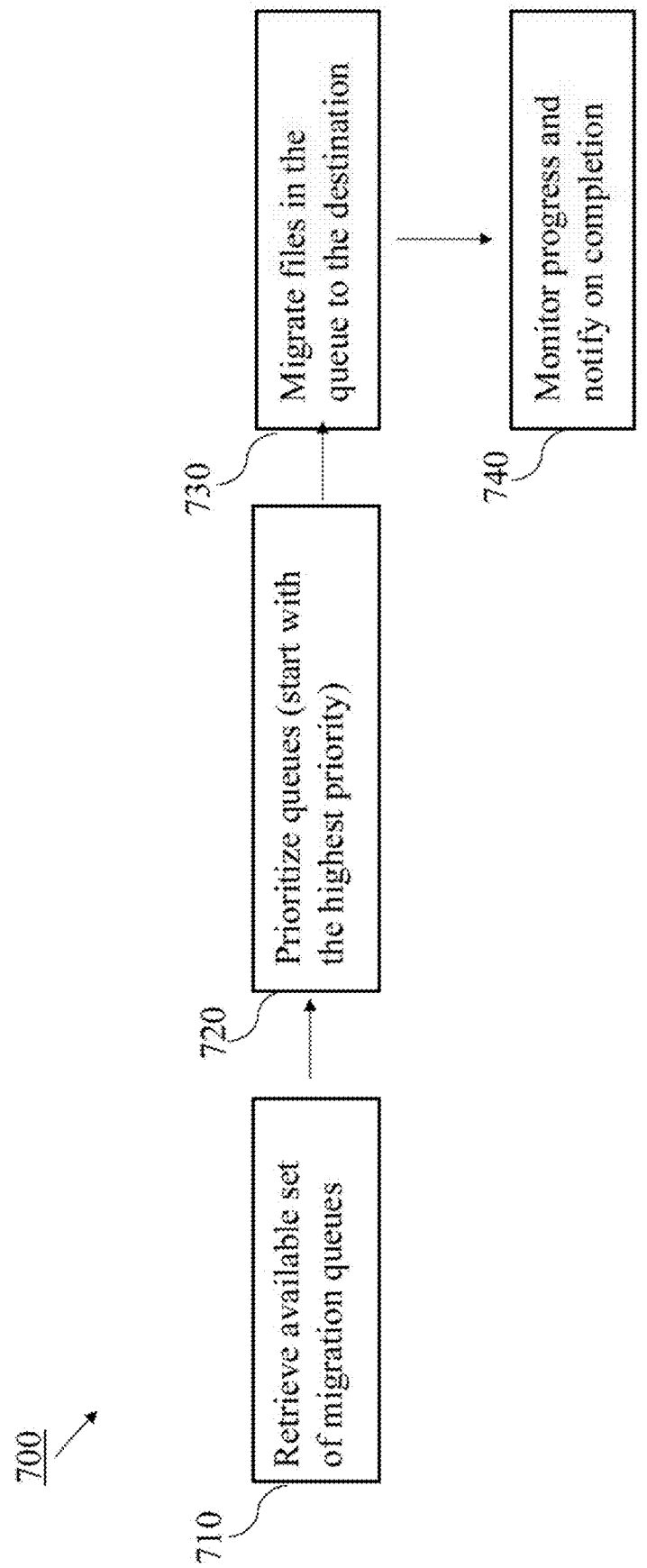
FIG. 7 is a high-level workflow of a file migration queues system, in accordance with some embodiments of the present disclosure.

According to some embodiments of the present disclosure, the file migration queue system 480 may monitor the progress of the migration process, as shown in FIG. 7.

FIG. 5 is a high-level workflow of a file-priority-score module 500, in accordance with some embodiments of the present disclosure.

According to some embodiments of the present disclosure, for files of data of an application, such as application 150 in FIG. 1A that is provided as Software as a Service (SaaS), the file-priority-score module 500, such as a file-priority-score module 130 in FIG. 1A may fetch the file, tenant or agent metadata 510 and use attributes form the metadata of the files for data migration, the tenants details, and the agents details. These attributes are fetched from the source-system systems. When the application is not SaaS, then the attributes of tenant details may not be considered.

According to some embodiments of the present disclosure, the metadata for the data files to be transferred are present in the file server system. The tenant management and user management systems contain the metadata for the tenants and the agents respectively. The file-priority-score module 500 may connect to the databases of these systems to fetch the metadata.

According to some embodiments of the present disclosure, Structured Query Language (SQL) queries may be executed and Application Programming Interface (API) calls to fetch metadata such as file creation date, file size, last accessed date, frequency of access, tenant information, and advisor details. The retrieved metadata may be collected and stored in a structured format, e.g., JavaScript Object Syntax (JSON) and DataFrame of Panda®, in a database for further processing.

According to some embodiments of the present disclosure, the file-priority-score module 500 may determine the metadata type 520, which may include identifying the attributes in the metadata set. Based on the datatype of each attribute it may be categorized as quantitative, i.e., having numerical numbers or qualitative, i.e., having categorical values.

According to some embodiments of the present disclosure, attributes may be considered quantitative if they have numerical values, and as qualitative if they are categorical. Quantitative Attributes:
1. File size, e.g., size of the customer interaction file.
2. Interaction duration, e.g., length of the call or chat.
3. File age, e.g., the time since the file was created.
4. Number of times the file has been accessed/downloaded.
5. Days since the file was last accessed/downloaded.
Qualitative Attributes:
1. File type, e.g., call recording, chat transcript, email.
2. Interaction type, e.g., sales inquiry, technical support.
3. Agent team, e.g., sales, support.
4. Agent proficiency level, e.g., beginner, expert.
5. Tenant Tier.

According to some embodiments of the present disclosure, the file-priority-score module 500 may check if the metadata positively corelated to the file priority score 530 by operating a correlation analysis, based on a configuration of weights and rules files, such as configuration of weights and rules files 120 in FIG. 1A. The configuration of weights and rules files may be a stored table of metadata attribute and file priority score relationship and corresponding attribute weights, for example, as shown in FIG. 10.

According to some embodiments of the present disclosure, criteria for positive correlation may be defined, i.e., higher attribute value leads to higher priority. The correlation may be evaluated by using SQL queries to fetch the relationship of the attribute to the file priority score from the configuration of weights and rules files and determine if an attribute is positively correlated.

According to some embodiments of the present disclosure, when the attribute is positively correlated, the file-priority-score module 500 may proceed to normalization using the maximization formula and calculate weighted product 540, otherwise, the file-priority-score module 500 may check for a negative correlation.

According to some embodiments of the present disclosure, when the attribute is positively corelated, the file-priority-score module 500 may normalize value using maximization formula and calculate weighted product by applying the maximization normalization formula and calculating the normalized value. By executing SQL queries, fetching the weight of the attribute from the configuration of weights and rules files and then assigning the weight for each attribute. A weighted product may be calculated for each attribute by multiplying the normalized value by the attribute's weight.

According to some embodiments of the present disclosure, the file-priority-score module 500 may check if the metadata negatively corelated to the file priority score 560. The criteria for negative correlation may be that higher attribute value leads to lower priority for file migration. By executing SQL queries, fetching the weight of the attribute from the configuration of weights and rules files and then assigning the weight for each attribute. When the attribute is negatively correlated, normalization may be operated by using the minimalization formula and a weighted product may be calculated 570 for each attribute by multiplying the normalized value by the attribute's weight.

the file-priority-score module 500 may calculate final file priority score from the weighted products of the attributes 550 by calculating the sum of the weighted products of all positively and negatively correlated attributes. The final file priority score of each data file for migration may be stored in a data structure.

FIG. 6 is a high-level workflow of a file ranking module 600, in accordance with some embodiments of the present disclosure.

According to some embodiments of the present disclosure, the file ranking module 600 may retrieve the file priority score for each file 610. The retrieval may be implemented by using SQL queries or APIs, to retrieve the previously calculated file priority scores and file identity from the database table. The scores may be stored in a list data structure for further processing.

According to some embodiments of the present disclosure, the file ranking module 600 may sort all files in descending order based on their priority scores 620. The sorting of all files may be operated by applying a quicksort algorithm to arrange the files in descending order of their priority scores. As a result, the highest priority scores may appear at the top of the list of files for migration to the target-system.

According to some embodiments of the present disclosure, the file ranking module 600 may check if the file rank is higher on the list of files 630. The determination of the rank may be operated by checking the position of the file in the sorted list, whether it appears at the top of the list or at the bottom of the list. If the file appears at the top of the list, the file ranking module 600 may proceed to copy the file's identity in a higher priority migration queue.

According to some embodiments of the present disclosure, the file ranking module 600 may allocate the file to a higher priority migration queue 640 by defining an in-memory list data structure as a high priority migration queue. The identities may be copied for the files that rank higher to the designated high-priority migration queue. The file identities copied in this queue will be migrated earlier when the actual migration starts.

According to some embodiments of the present disclosure, when checking that the file rank is lower on the list 650 by checking the position of the file in the sorted list, whether it appears at the top of the list or at the bottom of the list. If it appears at the bottom of the list, the file ranking module 600 may proceed to copy its identity in the low priority migration queue.

According to some embodiments of the present disclosure, the identities may be copied for the files that rank lower to the designated low-priority migration queue. The file identities copied in this queue will be migrated earlier when the actual migration starts.

FIG. 7 is a high-level workflow of a file migration queues system 700, in accordance with some embodiments of the present disclosure.

According to some embodiments of the present disclosure, the migration queues system 700 may manage the migration of the data files of the application which are used in the source-system to the target-system according to their assigned file score, prioritizing files in the high-priority migration queue.

According to some embodiments of the present disclosure, the migration queues system 700 may monitor the progress of each migration and issues notifications upon successful completion. In the event of failures. the migration queues system 700 may employ a retry mechanism and may raise an alarm if continuous failures persist.

According to some embodiments of the present disclosure, the migration queues system 700 may retrieve available set of migration queues 710 by identifying and retrieving the in-memory data structures representing all the queues e.g., high-priority, standard-priority, low-priority.

According to some embodiments of the present disclosure, the migration queues system 700 may prioritize the queues, starting with the high-priority queue by ensuring that data structures marked as high-priority migration queues are processed before standard and low-priority queues.

According to some embodiments of the present disclosure, the migration queues system 700 may migrate files in the queue to the target-system 730 by retrieving the file identities from the priority queue, using APIS to fetch the file corresponding to the retrieved identity from the file server, such as file server 420 in FIG. 4 and using a file transfer protocol, such as File Transfer Protocol (FTP) to transfer the file to the target-system.

According to some embodiments of the present disclosure, the migration queues system 700 may calculate the checksum of each migrated file and compare with the original to ensure successful file transfer.

According to some embodiments of the present disclosure, the migration queues system 700 may monitor progress and notify on completion of the migration process by monitoring metrics, such as the number of files migrated and failures if any. An alarm and dashboards may be set to track the progress of the migration process.

According to some embodiments of the present disclosure, the migration queues system 700 may be configured to send notifications upon the completion of the migration process and may ensure that stakeholders receive timely updates on the status of the data migration.

Figure 8:
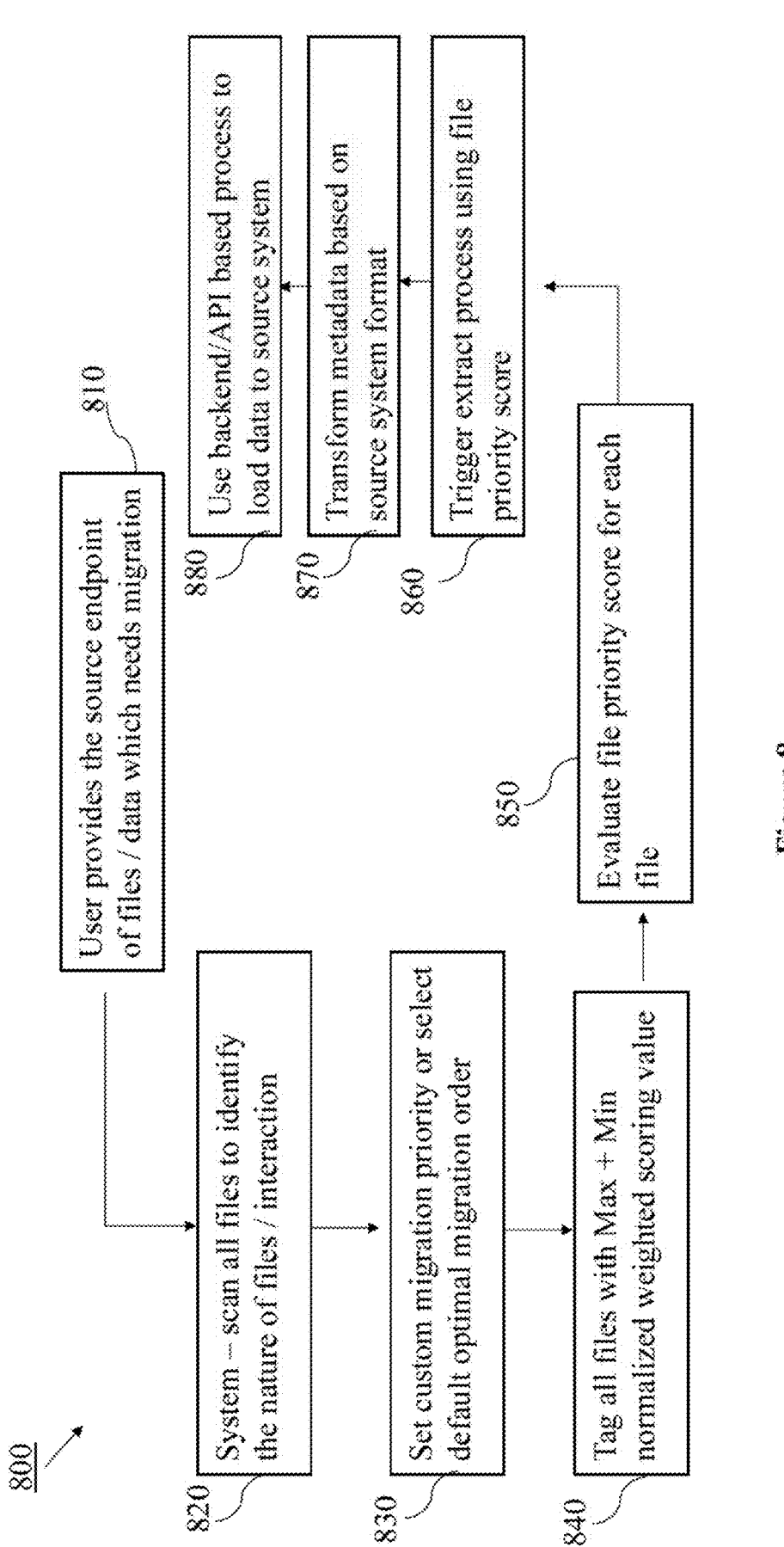
FIG. 8 is a high-level workflow of an optimized migration, in accordance with some embodiments of the present disclosure.

FIG. 8 is a high-level workflow of an optimized migration 800, in accordance with some embodiments of the present disclosure.

According to some embodiments of the present disclosure, a single click automation may trigger the entire optimized migration.

According to some embodiments of the present disclosure, the optimized migration 800 may be operated by system 100 in FIG. 1 and by computerized-method 200 for prioritizing migration sequence of data files of an application from a source-storage in a source-system to a target-system in a contact center in FIGS. 2A-2B.

According to some embodiments of the present disclosure, the user may provide the source endpoint of files or data which needs migration 810. The end user may provide the source of the files metadata tables or directory structure as input for migration to the target-system.

According to some embodiments of the present disclosure, all files in the source-system may be scanned to identify the nature of the files or interaction 820.

According to some embodiments of the present disclosure, all files in the source system may be analyzed to determine their type and the nature of the customer interactions they represent, such as calls, emails, or chats. This helps in categorizing and prioritizing the files for migration.

According to some embodiments of the present disclosure, a custom migration priority may be set, or a default optimal migration order may be selected 830.

According to some embodiments of the present disclosure, all files may be tagged with maximum or minimum weighted scoring value 840 and then the file priority score for each file may be evaluated 850.

According to some embodiments of the present disclosure, the extract process of the migration may be triggered by using the file priority score 860.

According to some embodiments of the present disclosure, the operations of transform metadata based on source-system format 870 and using backend or API based process to load data to source-system 880 may be operated by any ETL tool.

Figure 9:
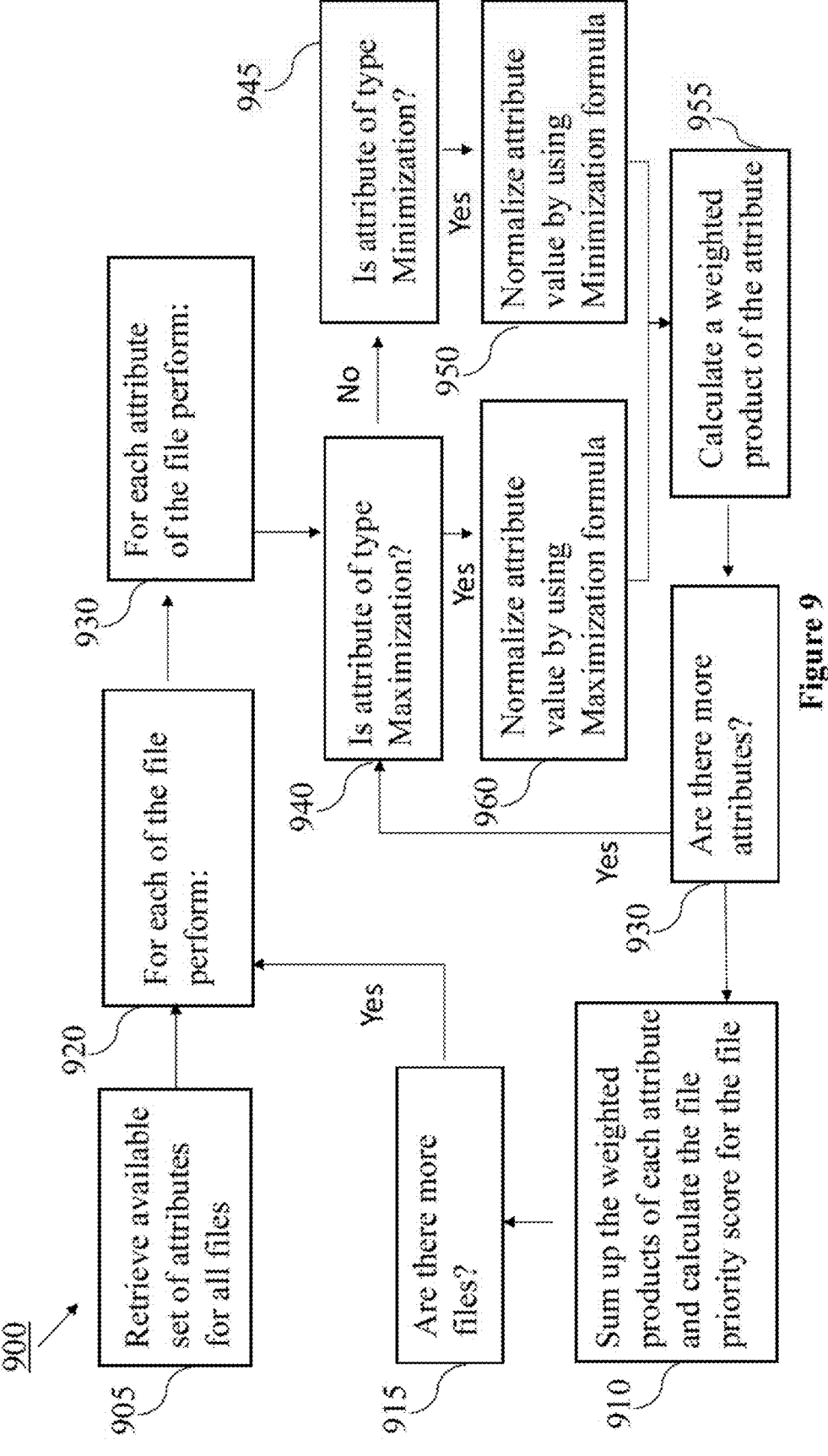
FIG. 9 is a high-level workflow of file priority score calculation, in accordance with some embodiments of the present disclosure.

FIG. 9 is a high-level workflow of file priority score calculation 900, in accordance with some embodiments of the present disclosure.

According to some embodiments of the present disclosure, a set of attributes, for example, as shown in FIG. 10, may be selected for the files in the source-system which are marked for migration. Each attribute represents a property for the file and is used to evaluate the file's overall importance with respect to the business, which may impact the file priority score for migration.

According to some embodiments of the present disclosure, the attributes may be ordinal in nature and may be assigned a weight based on their relative importance and contribution to the objective function of calculation of the File Priority Score (FPS).

According to some embodiments of the present disclosure, to ensure consistency during the calculation of the priority score, the attributes may be further categorized as maximization attributes and minimization attributes. The minimization attributes may encompass attributes that are best when kept at low values or are minimized. They exhibit a negative correlation with the target value, the file priority score. The maximization attributes may include attributes that are optimal when maximized or increased. They demonstrate a positive correlation with the file priority score.

According to some embodiments of the present disclosure, in a system, such as system 100 in FIG. 1A retrieving available set of attributes for all files 905 in the source system. For each of the files performing the following 920. For each attribute of the file performing the following 930. Checking if the attribute is of type maximization 940. If it is of type maximization, then normalizing attribute value by using maximization formula 960 and then calculating a weighted product of the attribute 955.

FIG. 10 is a table 1000 of attributes considered for calculation of the file priority score, in accordance with some embodiments of the present disclosure.

According to some embodiments of the present disclosure, in a system, such as system 100, the identified attributes related to customers interactions operations in the stored metadata of the file and agents' details may be for example, the attributes in table 1000.

According to some embodiments of the present disclosure, a normalized value of an attribute that the attribute-type is minimization-attribute may be calculated according to formula I:

$$normalizedValue \text{ of minimization attribute} = 1 - \frac{R_i - R_{min}}{R_{max} - R_{min}} \quad \text{(I)}$$

whereby:
$R_i$=Value of the attribute A for the given file,
$R_{min}$=Value of the attribute A for the given file, and
$R_{max}$=Value of the attribute A for the given file.

According to some embodiments of the present disclosure, for example for the attributes in table 1000:

$$normalized_{FileType_i} = 1 - \frac{R_{FileType_i} - R_{FileType_{min}}}{R_{FileType_{max}} - R_{FileType_{min}}}$$

$$normalized_{Tenant_i} = 1 - \frac{R_{Tenant_i} - R_{Tenant_{min}}}{R_{Tenant_{max}} - R_{Tenant_{min}}}$$

$$normalized_{FileSize_i} = 1 - \frac{R_{FileSize_i} - R_{FileSize_{min}}}{R_{FileSize_{max}} - R_{FileSize_{min}}}$$

$$normalized_{ContactStartDate_i} = 1 - \frac{R_{ContactStartDate_i} - R_{ContactStartDate_{min}}}{R_{ContactStartDate_{max}} - R_{ContactStartDate_{min}}}$$

$$normalized_{AgentOrTeam_i} = 1 - \frac{R_{AgentOrTeam_i} - R_{AgentOrTeam_{min}}}{R_{AgentOrTeam_{max}} - R_{AgentOrTeam_{min}}}$$

According to some embodiments of the present disclosure, a normalized value of an attribute that the attribute-type is maximization-attribute may be calculated according to formula II:

$$normalizedValue \text{ of maximization attribute} = \frac{R_i - R_{min}}{R_{max} - R_{min}} \quad \text{(II)}$$

whereby:
$R_i$ is a value of the attribute A for the given file,
$R_{min}$ is a value of the attribute A for the given file, and
$R_{max}$ is a value of the attribute A for the given file.

According to some embodiments of the present disclosure, for example for the attributes in table 1000, access date and access frequency:

$$normalized_{AccessDate_i} = \frac{R_{AccessDate_i} - R_{AccessDate_{min}}}{R_{AccessDate_{max}} - R_{AccessDate_{min}}}$$

$$normalized_{AccessFrequency_i} = \frac{R_{AccessFrequency_i} - R_{AccessFrequency_{min}}}{R_{AccessFrequency_{max}} - R_{AccessFrequency_{min}}}$$

FIG. 11 is a table 1100 of file type classification, in accordance with some embodiments of the present disclosure.

According to some embodiments of the present disclosure, the file type of the data files for migration from the source-system may be ranked, as shown in table 1100. The call recording file type may be the most important file type, and the coaching file type may be the least important one for the migration.

Figure 12:
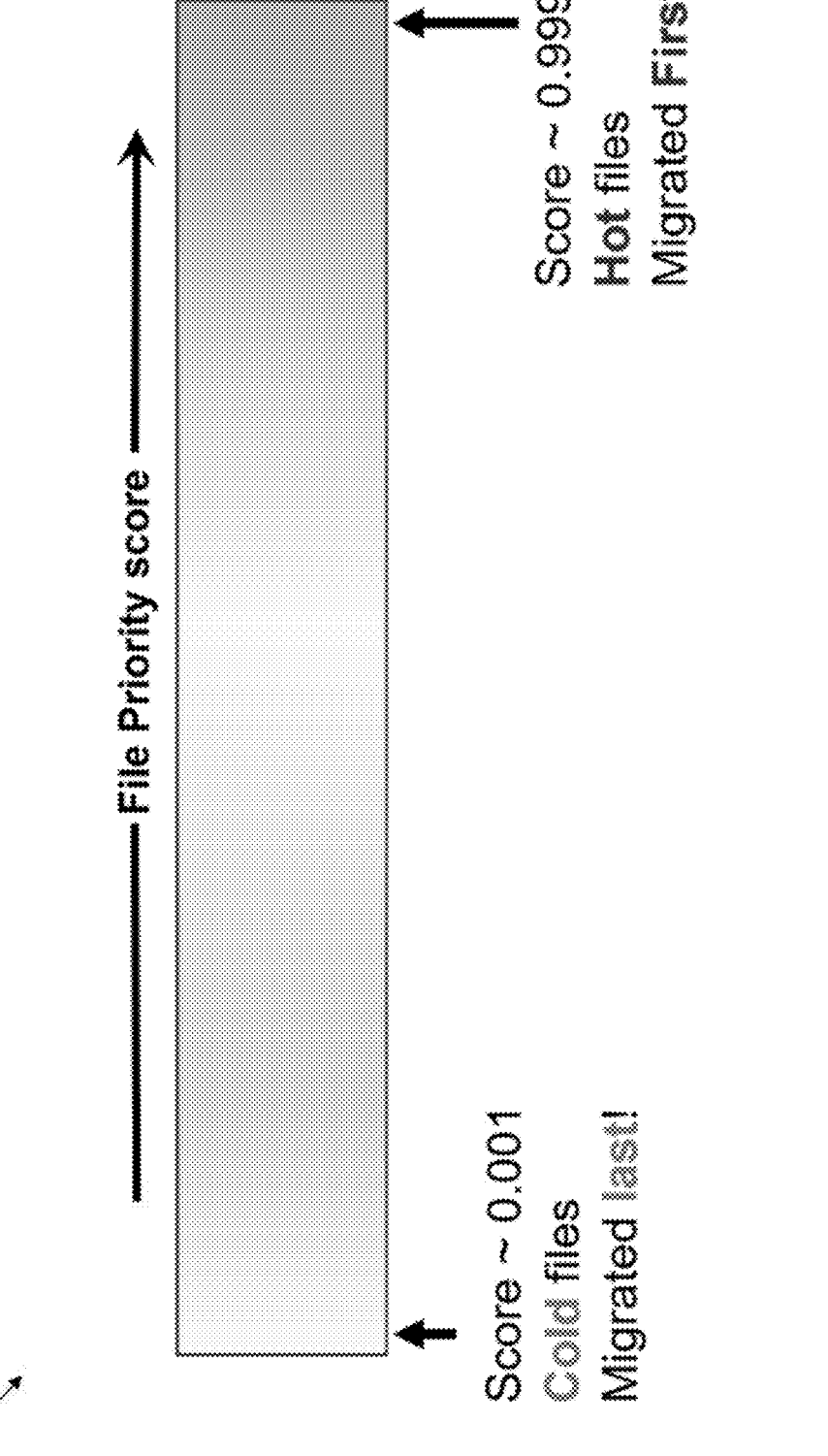
FIG. 12 is a range of file priority score and migration, in accordance with some embodiments of the present disclosure.

FIG. 12 is a range of file priority score and migration 1200, in accordance with some embodiments of the present disclosure.

According to some embodiments of the present disclosure, files for migration with priority score approaching 1.0 are deemed "hotter" and are prioritized for migration ahead of those nearing a score of 0.0, which are perceived as "colder" files, as shown the range 1200. This prioritization of the files allows efficient prioritization and management of the file migration process.

Figure 13A:
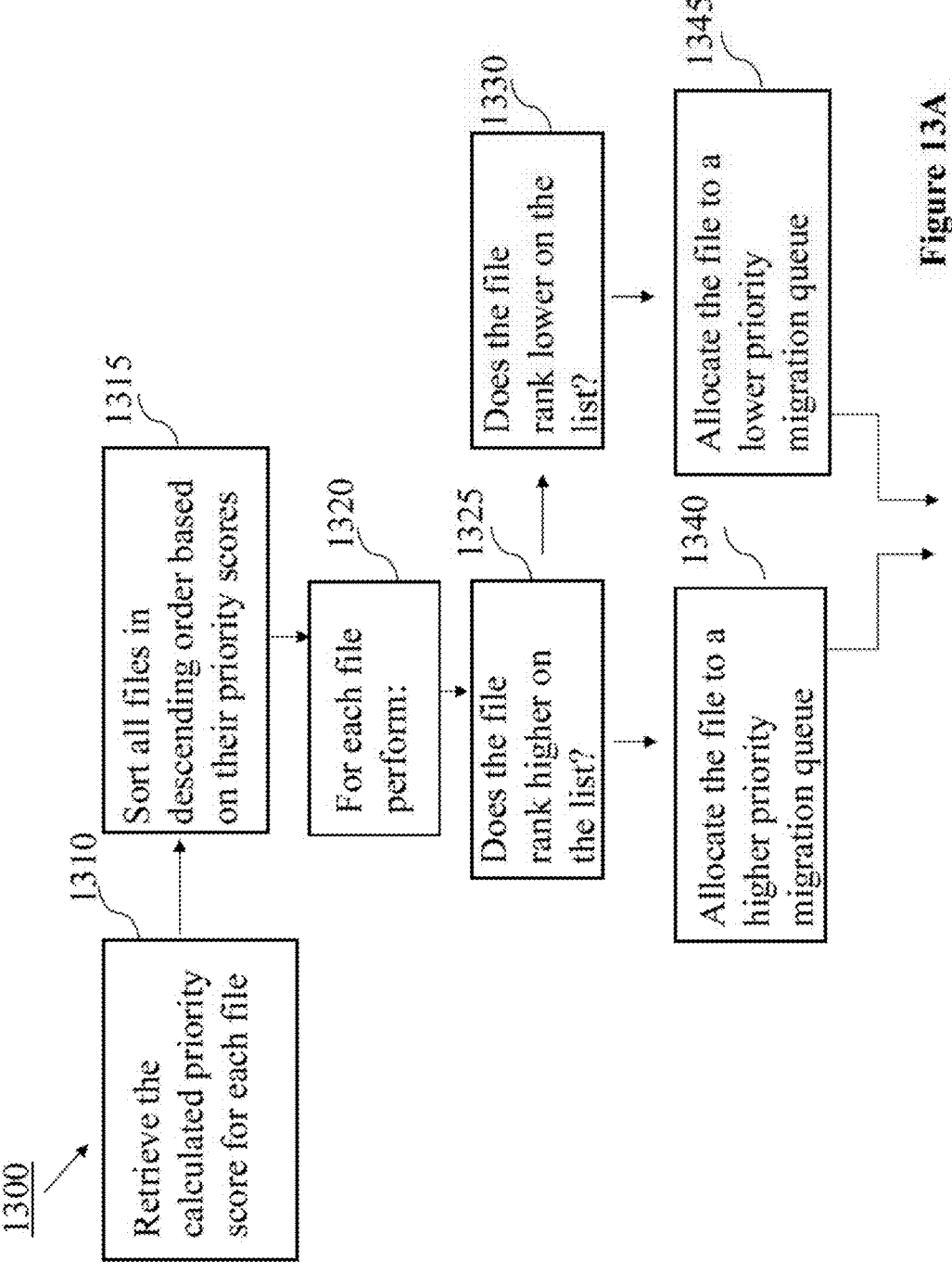
FIGS. 13A-13B are a high-level workflow of allocation of the files to queue and migration to target-system, in accordance with some embodiments of the present disclosure.
Figure 13B:
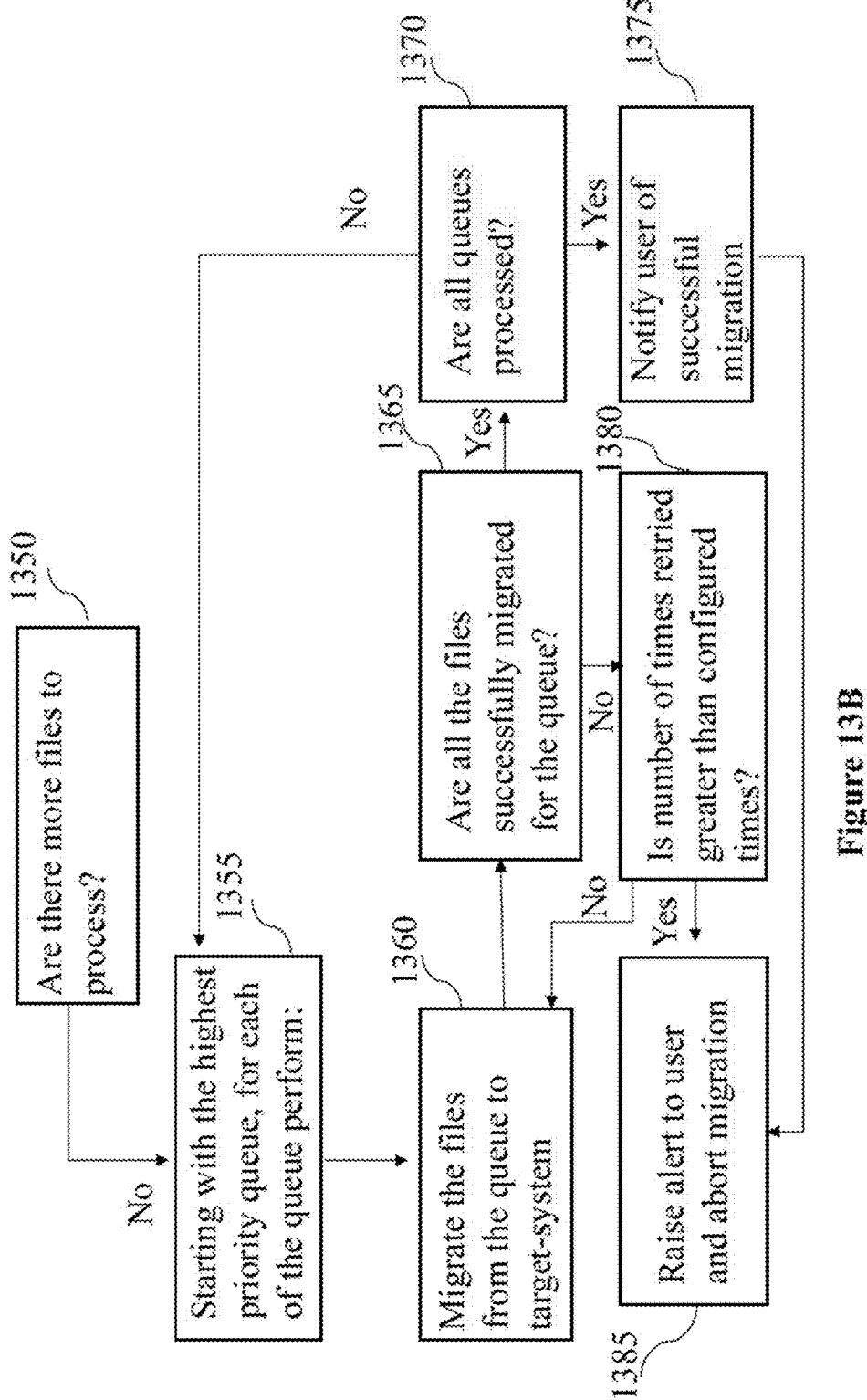

FIGS. 13A-13B are a high-level workflow 1300 of allocation of the files to queue and migration to target-system, in accordance with some embodiments of the present disclosure.

According to some embodiments of the present disclosure, in a system, such as system 100 in FIG. 1 after all files have been calculated a file priority score for the migration, retrieving the calculated priority score for each file 1310 and then sorting all files in descending order based on their priority scores 1315.

According to some embodiments of the present disclosure, for each file performing 1320 a check if the file rank, e.g. file priority score, is higher on the list 1325, e.g., above a preconfigured threshold. If it is higher than allocating the file to a higher priority migration queue 1340. If the file rank is lower on the list 1330, e.g., below a preconfigured threshold then allocating the file to a lower priority migration queue 1345.

According to some embodiments of the present disclosure, a check if there are more files to process 1350 may be operated. Starting with the highest priority queue, for each of the queue perform 1355: migrate the files from the queue to the target-system 1360. Then, checking if all the files were successfully migrated for the queue 1365. For example, when the data integrity tests, and one of the one or more recommended tests have been successful. The one or more recommended tests may include core functionality tests, performance testing, user experience testing and compatibility tests.

According to some embodiments of the present disclosure, checking if all queues have been processed 1370. When all queues have been processed, notifying the user of successful migration 1375. When not all files were successfully migrated for the queue, checking if the number of times retried is greater than the configured times for retry 1380. When it is greater than the configured times for retry then raising an alert to the user and aborting the migration process 1385 otherwise migrating the files form the queue to the target-system 1360.

Figure 14:
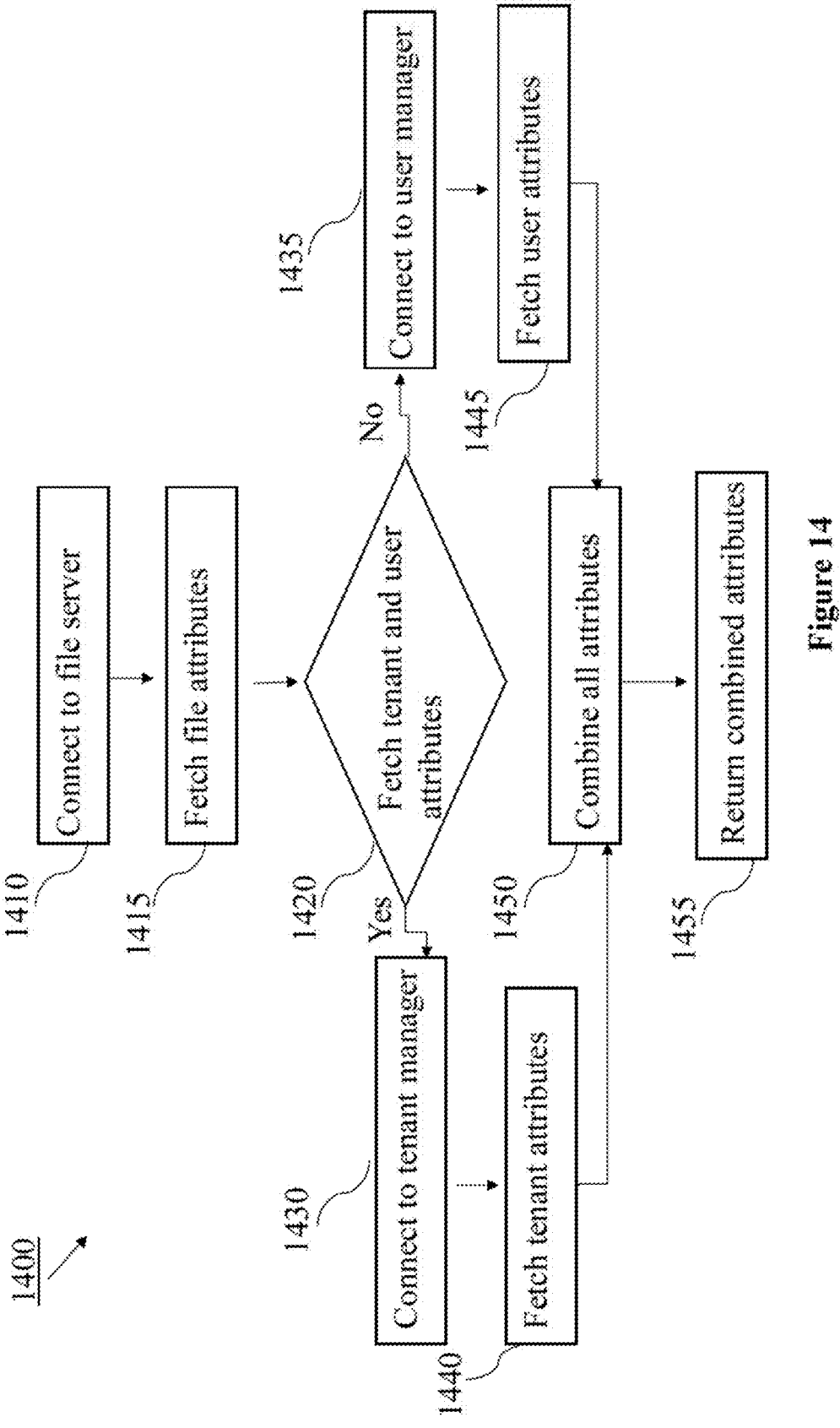
FIG. 14 is a high-level workflow of file attributes retrieval, in accordance with some embodiments of the present disclosure.

FIG. 14 is a high-level workflow of file attributes retrieval 1400, in accordance with some embodiments of the present disclosure.

According to some embodiments of the present disclosure, in a system, such as system 100, the file attributes retrieval may start by connecting to the file server 1410. The connection to the file server may be performed by establishing the connection to the file server to access the files and the related metadata.

According to some embodiments of the present disclosure, the file attributes may be fetched 1415 by retrieving the attributes of the files from the file server by using APIs. These attributes may include file size, creation date, last modified date, file type, and the like, for example, as shown in FIG. 10.

According to some embodiments of the present disclosure, determining if there is a need to fetch tenant and user attributes 1420. When the application is a SaaS application, then there is a need to fetch tenant and user attributes, then connecting to tenant manager 1430, by establishing a connection to the tenant manager application which manages information about the tenants. Otherwise, connecting to user manager 1435.

According to some embodiments of the present disclosure, when connecting to tenant manager 1430, fetching tenant attributes 1440 by retrieving the attributes of the tenant associated with the files. Tenant attributes could include tenant ID, tenant name, subscription level, and the like.

According to some embodiments of the present disclosure, when connecting to the user manager 1435, establishing a connection to the user manager application, which manages information about the users and fetching the user attributes 1445 by retrieving the attributes of the user associated with the files. User attributes may include user ID, user role, department, and the like.

According to some embodiments of the present disclosure, all attributes may be combined 1450, which are the file attributes, the tenant attributes and user attributes into a comprehensive dataset that represents all relevant information for each file.

According to some embodiments of the present disclosure, the combined dataset may be returned 1455 as an output of the procedure.

FIG. 15 is a table 1500 of simulation results with the calculated file priority score of each file type, in accordance with some embodiments of the present disclosure.

According to some embodiments of the present disclosure, a simulation of the operation of a system, such as system 100 in FIG. 1 may be operated with the following dataset. 10 tenants ranked 1 to 10, 20 file types, 5 agent teams ranked 1 to 5, highest file size=50 mb, oldest contact=50 days, oldest access date=50 days, highest access frequency for any file=10. The files in the table 1500 are the ones with highest priority.

Figure 16:
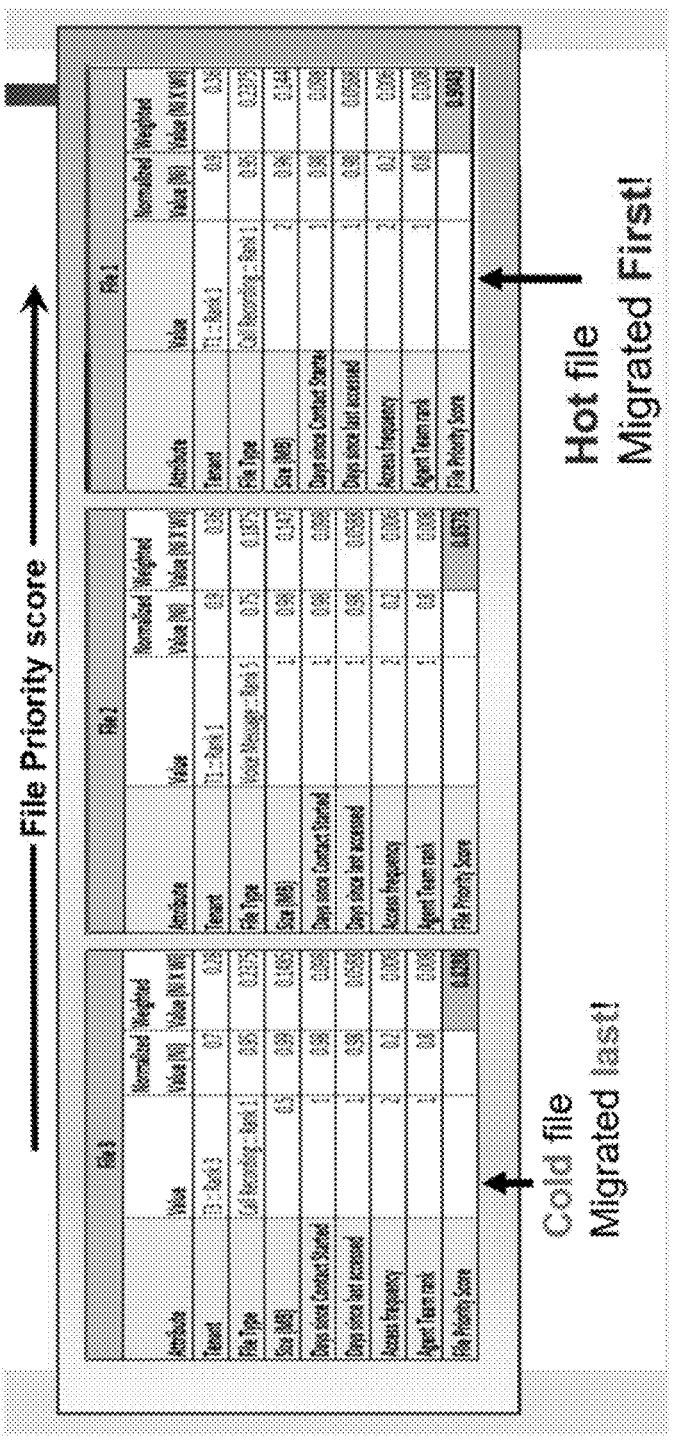
FIG. 16 is a table of file score priority score and attributes, in accordance with some embodiments of the present disclosure.

FIG. 16 is a table 1600 of file score priority score and attributes, in accordance with some embodiments of the present disclosure.

According to some embodiments of the present disclosure, a simulation of the operation of a system, such as system 100 in FIG. 1 may be operated on two different tenants having a similar type of files and each tenant has two different types of files.

According to some embodiments of the present disclosure, the simulation results illustrated in table 1600 demonstrate the execution outcomes for three files: Two "Call Recording" files—File1 and File3 which are belonging to two different tenants, T1 and T3, respectively. Tenant T1 holds a higher priority compared to Tenant T3, while the files share similar characteristics. One "Voice Message" file from Tenant T1. As indicated by the results, the "Call Recording" file associated with Tenant T1 (the higher-tier tenant) received the highest priority score, resulting in its earlier migration. Conversely, the "Call Recording" file from Tenant T3 which is the lower-tier tenant was assigned the lowest priority score, leading to its migration occurring last.

According to some embodiments of the present disclosure, the input dataset includes: two "Call Recording" files—File1 and File3—belonging to two different tenants—T1 and T3 respectively, where Tenant T1 is of higher priority compared to Tenant T3. The files were very similar in their other characteristics. One "Voice Message" file belongs to Tenant T1.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus, certain embodiments may be combinations of features of multiple embodiments. The foregoing description of the embodiments of the disclosure has been presented for the purposes of illustration and description. It is not intended to be exhaustive or to limit the disclosure to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the disclosure.

While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure.

What is claimed:

1. A computerized-method for prioritizing migration sequence of data files of an application from a source-storage in a source-system to a target-storage in a target-system in a contact center, said computerized-method comprising:

a) for each data file with customers interactions data in the source-storage that has been marked for migration:

(i) retrieving metadata of the file and storing the metadata in a metadata-database;

(ii) retrieving agents details from an agents-database;

(iii) identifying one or more attributes related to customers interactions operations in the stored metadata of the file and agents' details;

(iv) receiving a configuration of weights and rules files, wherein said configuration of weights and rules files includes an attribute-type associated to each attribute, (v) normalizing value of each attribute in the one or more attributes based on a preconfigured formula that is related to the associated attribute-type; and (vi) operating a file-priority-score module to score priority of the file based on the normalized value of each attribute in the one or more attributes; and b) migrating files to the target-storage in the target-system based on their score of priority.

2. The computerized-method of claim 1, wherein said attributes related to customers interactions operations include at least one of: (i) file type; (ii) file size; (iii) interaction duration; (iv) file age; (v) period since last accessed; (vi) access frequency; (vii) agent; and (viii) team, and wherein said agents details include for each agent at least one of: (i) agent team priority; and (ii) agent proficiency level.

3. The computerized-method of claim 2, wherein the data migration is to a cloud storage and the contact center is a cloud-based contact center, said attributes related to customers interactions operations further include tenant tier and tenant size.

4. The computerized-method of claim 3, wherein said computerized-method further comprising: retrieving tenant tier and tenant size from a tenant-metadata database.

5. The computerized-method of claim 1, wherein the attribute-type is one of: (i) maximization-attribute; and (ii) minimization-attribute.

6. The computerized-method of claim 1, wherein the files in the source-storage with customers interactions data that has been marked for migration are files that have been generated during a preconfigured period.

7. The computerized-method of claim 1, wherein said configuration of weights and rules files further includes a weight associated to each attribute in the one or more attributes, and wherein said file-priority-score module comprising:

(i) calculating a weighted product of each normalized value of the attribute in the one or more attributes based on the associated weight; and (ii) calculating a sum of weighted products of the one or more attributes to yield a score to the file.

8. The computerized-method of claim 7, wherein said attribute-type and weight associated to each attribute in the configuration of weights and rules files determines a level of significance and usage criticality of the file during customers interactions operations.

9. The computerized-method of claim 1, wherein said computerized-method further comprising operating the application via the target-system after a preconfigured number of data files from all data files in the source-storage have been migrated to the target-storage.

10. The computerized-method of claim 9, wherein said computerized-method further comprising checking operation of the application with the preconfigured number of files that have been migrated to the target-storage, wherein said checking comprising:

(i) operating the application for a preconfigured subset of customers;

(ii) testing the application by operating at least one of: a. data integrity tests; and one or more recommended tests;

(iii) determining a failure migration of the preconfigured number of files that have been migrated to the target-storage when the data integrity tests have failed and when the data integrity tests were successful, and the one or more recommended tests have failed; and (iv) determining a successful migration of the preconfigured number of files that have been migrated to the target-storage when the data integrity tests, and one of the one or more recommended tests have been successful.

11. The computerized-method of claim 10, wherein said one or more recommended tests comprising: a. core functionality tests; b. performance testing; and c. user experience testing.

12. The computerized-method of claim 10, wherein when determining the failure migration, the computerized-method further comprising: stopping the migrating files to the target-storage in the target-system based on their score of priority
and operating corrective actions.

* * * * *